United States Patent
Ono et al.

(10) Patent No.: US 10,375,688 B2
(45) Date of Patent: Aug. 6, 2019

(54) BASE STATION AND WIRELESS COMMUNICATION SYSTEM

(71) Applicant: Godo Kaisha IP Bridge 1, Tokyo (JP)

(72) Inventors: Go Ono, Musashino (JP); Kenzaburo Fujishima, Kokubunji (JP); May Takada, Kawasaki (JP); Koki Uwano, Fujisawa (JP)

(73) Assignee: GODO KAISHA IP BRIDGE 1, Tokyo (JP)

( * ) Notice: Subject to any disclaimer, the term of this patent is extended or adjusted under 35 U.S.C. 154(b) by 96 days.

(21) Appl. No.: 15/072,781

(22) Filed: Mar. 17, 2016

(65) Prior Publication Data
US 2016/0198458 A1    Jul. 7, 2016

Related U.S. Application Data

(63) Continuation of application No. 13/146,663, filed as application No. PCT/JP2009/052007 on Jan. 30, 2009, now abandoned.

(51) Int. Cl.
*H04W 72/04* (2009.01)
*H04B 7/024* (2017.01)
(Continued)

(52) U.S. Cl.
CPC ........ *H04W 72/0426* (2013.01); *H04B 7/024* (2013.01); *H04B 7/0413* (2013.01);
(Continued)

(58) Field of Classification Search
None
See application file for complete search history.

(56) References Cited

U.S. PATENT DOCUMENTS

| | | |
|---|---|---|
| 2004/0248581 A1 | 12/2004 | Seki et al. |
| 2005/0101328 A1* | 5/2005 | Son ........... H04W 36/26 455/436 |

(Continued)

FOREIGN PATENT DOCUMENTS

| | | |
|---|---|---|
| CN | 1972515 A | 5/2007 |
| CN | 101291169 A | 10/2008 |

(Continued)

OTHER PUBLICATIONS

R1-083229 TSG-RAN WG1 #54, LTE-A Multi-point Coordination and Its Classification, Jeju, South Korea, Aug. 18-22, 2008.*
(Continued)

*Primary Examiner* — Brian S Roberts
*Assistant Examiner* — Thinh D Tran
(74) *Attorney, Agent, or Firm* — Seed IP Law Group LLP

(57) ABSTRACT

It is provided a wireless communication system comprising base stations that transmit data to a terminal with cooperation by the base stations. The terminal communicates with the base stations. The terminal periodically transmits, to one of the base stations, information necessary for data transmission from a single base station out of the base stations. Each of the base stations determines whether the terminal needs data transmission through a cooperation among the base stations, and transmits a cooperation information transmission instruction to the terminal, which includes information necessary to execute the data transmission in order to cooperate among the base stations in the case where it is determined that the terminal needs the data transmission through the cooperation among the base stations. The terminal transmits the cooperation information to the base stations in a case of receiving the cooperation information transmission instruction.

12 Claims, 22 Drawing Sheets

(51) Int. Cl.

| | | |
|---|---|---|
| *H04B 7/0413* | (2017.01) | |
| *H04L 5/00* | (2006.01) | |
| *H04W 28/02* | (2009.01) | |
| *H04W 40/06* | (2009.01) | |
| *H04W 72/12* | (2009.01) | |
| *H04W 88/02* | (2009.01) | |
| *H04W 88/08* | (2009.01) | |
| *H04W 88/16* | (2009.01) | |

(52) U.S. Cl.
CPC ....... *H04L 5/0055* (2013.01); *H04W 28/0236* (2013.01); *H04W 40/06* (2013.01); *H04W 72/1236* (2013.01); *H04L 5/0035* (2013.01); *H04L 5/0057* (2013.01); *H04W 88/02* (2013.01); *H04W 88/08* (2013.01); *H04W 88/16* (2013.01)

(56) References Cited

U.S. PATENT DOCUMENTS

| | | | |
|---|---|---|---|
| 2007/0115796 | A1 | 5/2007 | Jeong et al. |
| 2007/0254596 | A1* | 11/2007 | Corson ................ H04L 5/0035 455/68 |
| 2008/0045139 | A1* | 2/2008 | Chen ..................... H04W 16/14 455/3.04 |
| 2008/0273497 | A1 | 11/2008 | Lu et al. |
| 2008/0310405 | A1 | 12/2008 | Cox et al. |
| 2009/0207822 | A1* | 8/2009 | Kim ...................... H04B 7/026 370/338 |
| 2009/0215480 | A1 | 8/2009 | Kim et al. |
| 2010/0046470 | A1 | 2/2010 | Sekiya |
| 2010/0309998 | A1 | 12/2010 | Jung et al. |
| 2011/0090836 | A1 | 4/2011 | Mochizuki et al. |
| 2011/0305195 | A1 | 12/2011 | Forck et al. |

FOREIGN PATENT DOCUMENTS

| | | |
|---|---|---|
| JP | 2003-152639 A | 5/2003 |
| WO | WO 2004/077871 A1 | 9/2004 |
| WO | WO 2008/038336 A1 | 4/2008 |
| WO | WO 2008/090914 A1 | 7/2008 |
| WO | WO 2008/116027 A2 | 9/2008 |

OTHER PUBLICATIONS

International Search Report with English translation dated Apr. 21, 2009 (five (5) pages).
Form PCT/ISA/237 (three (3) pages).
Mailaender, Laurence, "Indoor Network MIMO Performance with Regularized Zero-Forcing Transmission", IEEE, pp. 129-132,(four (4) pages).
"3$^{rd}$ Generation Partnership Project; Technical Specification Group Radio Access Network; Further Advancements for E-UTRA Physical Layer Aspects (Release X)", 3GPP TR 36.814 V0.0.1 (Sep. 2008), pp. 1-8, (eight (8) pages).
3$^{rd}$ Generation Partnership Project: Technical Specification Group Radio Access Network; Evolved Universal Terrestrial Radio Access (E-UTRA); Physical layer procedures (Release 8), 3GPP TS 36.213 V8.4.0 (Sep. 2008), pp. 1-60.
3$^{rd}$ Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), pp. 1-78.
3$^{rd}$ Generation Partnership Project; Technical Specification Group Radio Access Network; Evolved Universal Terrestrial Radio Access (E-UTRA); LTE Physical Layer—General Description (Release 8), 3GPP TS 36.201 V8.1.0 (Nov. 2007), pp. 1-13.
3$^{rd}$ Generation Partnership Project; Technical Specification Group Radio Access Network; Evolved Universal Terrestrial Radio Access (E-UTRA);Multiplexing and channel coding (Release 8), 3GPP TS 36.212 V8.4.0 (Sep. 2008), pp. 1-56.
Japanese-language Office Action dated Jun. 25, 2013 (Two (2) pages).
"Multi-cell MIMO Schemes for IEEE 802.16m," Samsung Electronics, EEE 802.16 Broadband Wireless Access Working Group, Jul. 7, 2008, pp. 1-8.
"Network MIMO Precoding," Texas Instruments, 3GPP TSG RAN WG1 #53bis, Jun. 30-Jul. 4, 2008, pp. 1-4, vol. 12, Warsaw, Poland.
Chinese Office Action dated Jul. 3, 2013 (six (6) pages).
European Search Report dated Jul. 28, 2014 (six pages).
Motorola "Coordinated Multi-Point Transmission—Exploring Possible System Operations and UE Support" 3$^{rd}$ Generation Partnership Project, Nov. 10-14, 2008, four pages, TSG-RAN WG1 #55, Prague, Czech Republic.
Samsung "Further discussion on Inter-Cell Interference Mitigation through Limited Coordination" 3$^{rd}$ Generation Partnership Project, Sep. 29-Oct. 3, 2008, 11 pages, 3GPP TSG RAN WG1 Meeting #54bis, Prague, Czech Republic.

* cited by examiner

| 551 | 552 | 553 | 554 | 555 550 |
|---|---|---|---|---|
| TERMINAL | DATA ARRIVAL TIME | DATA AMOUNT | COOPERATION INSTANTANEOUS THROUGHPUT | AVERAGE THROUGHPUT |
| TERMINAL#1 | aaaa | bbbb | cccc | dddd |
| : | | | | |

| NUMBER OF TOTAL RESOURCE BLOCK | SUBBAND SIZE | NUMBER OF SUBBAND |
|---|---|---|
| 10 | 2 | 5 |
| 26 | 2 | 13 |
| 63 | 3 | 21 |
| 110 | 4 | 28 |

BASE STATION AND WIRELESS COMMUNICATION SYSTEM

CROSS REFERENCE TO RELATED APPLICATIONS

This application is a continuation of U.S. application Ser. No. 13/146,663, filed Jul. 28, 2011, which is a National Stage of PCT International Application No. PCT/JP2009/052007, filed on Jan. 30, 2009, the disclosures of which are expressly incorporated by reference herein.

BACKGROUND OF THE INVENTION

This invention relates to a wireless communication system which enables a plurality of base stations to cooperate with one another in transmitting and receiving data to and from at least one wireless communication terminal.

In wireless communication, a wireless communication terminal at the cell edge cannot obtain a sufficient user rate because the signal-to-interference-and-noise ratio (SINR) is deteriorated by the attenuation with distance of a desired wave power from a base station to which the wireless communication terminal belongs and by the influence of interference waves from adjacent base stations.

As a technology that solves this problem and improves the user rate of a wireless communication terminal at the cell edge, base station cooperation technology is known in which base stations cooperate with one another in transmitting and receiving data to and from a wireless communication terminal.

The base station cooperation technology continues to be considered for Long Term Evolution (LTE) of 3rd Generation Partnership Project (3GPP) (see, for example, 3GPP TS 36.201 v8.1.0 (November 2007), and 3GPP TS 36.211, TS 36.212, TS 36.213 v8.4.0 (September 2008)), which has been decided all over the world to be employed as 3.9-generation wireless communication systems, and is expected to be incorporated in the standards of Long Term Evolution-Advanced (LTE-A) (see, for example, 3GPP TR36.814 V0.0.1 (September 2008)), which is the successor of LTE and one of the candidates for the fourth-generation wireless communication systems.

Known concrete data transmission methods in which base stations cooperate with one another include interference avoidance and network Multiple Input Multiple Output (MIMO) (see, for example, Laurence Mailaender, "Indoor Network MIMO Performance with Regularized Zero-Forcing Transmission," IEEE ISSSTA 2008, pp. 129-132, August 2008).

Interference avoidance is a technology in which base stations each use Beam Forming (BF) to give high directivity to transmission signals in a manner that prevents signals of adjacent base stations from overlapping one another, thereby avoiding interference and improving SINR.

Network MIMO is an expansion of conventional MIMO transmission, which uses a plurality of antennas provided in one base station. Network MIMO uses a plurality of antennas provided in a plurality of base stations to perform MIMO transmission.

The following description of this invention focuses on network MIMO. It should be noted, however, that this invention is not limited to network MIMO and is applicable to other methods.

Network MIMO operation described here is classified into single-user transmission (SU transmission) and multi-user MIMO transmission (MU-MIMO transmission).

The premise of this invention is that wireless resources are multiplexed by Orthogonal Frequency Division Multiple Access (OFDMA), which is employed for downlink (downstream) in LTE. However, this invention is not limited to OFDMA and is applicable to other multiplexing methods such as Time Division Multiple Access (TDMA) and Code Division Multiple Access (CDMA).

In SU transmission, a base station selects one wireless communication terminal and transmits data to the selected wireless communication terminal.

A wireless communication terminal in SU transmission receives pilot signals from a base station to which the wireless communication terminal belongs and from adjacent base stations, and estimates the channel.

Based on the result of estimating the channel, the wireless communication terminal calculates the quality of the channel to be obtained in the case where network MIMO transmission is used, the number of MIMO ranks, and a desired precoding matrix.

The wireless communication terminal transmits at least one of the above-mentioned calculated items and a list of base stations that participate in cooperative transmission to the base station to which the wireless communication terminal belongs, with the use of an uplink (upstream) control signal.

The base station that receives the control signal notifies information contained in the received control signal to a cooperation scheduler, which executes wireless resource allocation in base station cooperation.

The cooperation scheduler selects an optimum wireless communication terminal, a data transmission method, a subcarrier to be used, and the like based on the notified information, and notifies the selection results to the base stations that participate in cooperative transmission. An optimum wireless communication terminal can be selected for each subcarrier of OFDMA.

For example, network MIMO transmission between base stations 1 and 2 and wireless communication terminals 1 and 2 may be carried out such that the base stations 1 and 2 transmit by network MIMO transmission to the wireless communication terminal 1 on subcarriers 1 to 12, and to the wireless communication terminal 2 on subcarriers 13 to 24.

Network MIMO transmission methods that can be employed in SU transmission may include a method that uses Open-Loop MIMO transmission where a wireless communication terminal does not need to specify a precoding matrix, and the wireless communication terminal uses Minimum Mean Square Error (MMSE) or Maximum Likelihood Detection (MLD) as in normal MIMO, a method that uses Closed-Loop MIMO transmission such as Eigen Space Division Multiplexing (E-SDM), and a method that is used in, for example, transmit diversity such as Space Time Transmit Diversity (STTD).

In any of the methods given above, base stations participating in cooperative transmission exchange data necessary for cooperative transmission with one another before transmitting to a wireless communication terminal, generate signals in accordance with the employed method, and transmit the generated signals to the target wireless communication terminal. The wireless communication terminal decodes the signals in accordance with the method selected by the base stations, and obtains the data.

The wireless communication terminal that is the target of network MIMO transmission receives a desired signal from the base stations participating in cooperation, and the channel capacity is therefore markedly improved in any of the methods given above.

MU-MIMO transmission is an application of MIMO in which data is transmitted to a plurality of wireless communication terminals.

In MU-MIMO transmission, as in transmission to a single wireless communication terminal, a wireless communication terminal receives pilot signals from a base station to which the wireless communication terminal belongs and from adjacent base stations, and estimates the channel.

Based on the result of estimating the channel, the wireless communication terminal calculates the quality of the channel to be obtained in the case where network MIMO transmission is used, the number of MIMO ranks, a desired precoding matrix, and channel matrices of a plurality of base stations.

The wireless communication terminal transmits at least one of the above-mentioned calculated items and a list of base stations that participate in cooperative transmission to the base station to which the wireless communication terminal belongs, with the use of an uplink control signal.

The base station that receives the control signal notifies information contained in the received control signal to a cooperation scheduler, which executes wireless resource allocation in base station cooperation.

The cooperation scheduler selects an optimum combination of wireless communication terminals, a data transmission method, a subcarrier to be used, and the like based on the notified information, and notifies the selection results to the base stations that participate in cooperative transmission. An optimum combination of wireless communication terminals can be selected for each subcarrier of OFDMA.

For example, network MIMO transmission between base stations 1 and 2 and wireless communication terminals 1, 2 and 3 may be carried out such that the base stations 1 and 2 transmit by network MIMO transmission to the wireless communication terminals 1 and 2 on subcarriers 1 to 12, and to the wireless communication terminals 2 and 3 on subcarriers 13 to 24.

Network MIMO transmission methods that can be employed in MU-MIMO transmission may include a method that uses Zero Forcing (ZF) where the transmission side performs precoding with the use of an inverse matrix of a channel matrix, and a method that uses Dirty Paper Coding (DPC) where the channel capacity is improved by utilizing information about an interference signal.

ZF can be implemented based on a simple principle, but has a problem in that amplification exceeding the upper limit of transmission power is necessary depending on the inverse matrix of a channel matrix, which degrades the channel capacity.

DPC, on the other hand, is superior to ZF in terms of channel capacity but has a problem in that the amount of calculation is large. One of known DPC implementation methods that alleviate the problem is a method that uses LQ decomposition.

In the method that uses LQ decomposition, a channel matrix is decomposed into a lower triangular matrix and a product of unitary matrices. The transmission side executes advance equalization processing based on the lower triangular matrix, and executes precoding through Hermitian transposition of the unitary matrices. This procedure requires an amount of calculation that can be implemented in practice and, because unitary matrices are used in precoding, does not cause the extreme amplification of signal amplitude as in ZF. As a result, interference from adjacent cells is cancelled in a wireless communication terminal and the channel capacity is therefore improved.

SUMMARY OF THE INVENTION

In the case of MIMO transmission in a wireless communication system where base stations cooperate with one another to transmit data, a wireless communication terminal needs to periodically transmit the quality of a channel between the wireless communication terminal and a base station to which the wireless communication terminal belongs, the quality of the channel in cooperative transmission, the number of MIMO ranks, and an index of a desired precoding matrix to the base station with the use of uplink wireless resources.

When the MIMO transmission is transmission to a plurality of wireless communication terminals, the wireless communication terminal further needs to transmit a matrix of channels between the wireless communication terminal and all base stations participating in cooperative transmission to the base station with the use of uplink wireless resources.

In the case of multicarrier transmission such as OFDMA, considering the influence of frequency-selective fading, information necessary for base station cooperation is desirably transmitted to base stations on a subband-basis as described above.

A subband here means a band formed by bundling a plurality of consecutive subcarriers together, and the entire band of the system can be divided into a plurality of subbands. At least one resource block is present in a single subband.

Each wireless communication terminal spends uplink wireless resources to transmit information necessary for base station cooperation to the base station as described above. Accordingly, an increase in the number of wireless communication terminals belonging to the base station means a larger consumption of uplink wireless resources for the transmission of information necessary for base station cooperation, and cuts into uplink wireless resources that are used for user data transmission. This is a serious problem when the increasing popularity of such applications as IP phone and video uploading is taken into account.

Another problem of data transmission in which base stations cooperate with one another is that the amount of calculation for allocating wireless resources, namely, the processing amount of the cooperation scheduler, increases.

Take as an example the allocation of wireless resources to one resource block. The term resource block here means the unit by which wireless resources are allocated, and each resource block is an aggregation of consecutive subcarriers.

In non-cooperative data transmission which involves a single base station, the cooperation scheduler selects for SU transmission an optimum wireless communication terminal from among wireless communication terminals that belong to the base station, and selects for MU-MIMO transmission an optimum combination of wireless communication terminals from among the wireless communication terminals that belong to the base station.

In data transmission where base stations cooperate with one another, the cooperation scheduler needs to select an optimum wireless communication terminal, or an optimum combination of wireless communication terminals, from among all wireless communication terminals that belong to the respective base stations participating in the cooperation.

Further, there is a plurality of possible combinations concerning which base stations are to participate in the cooperation, which of the cooperation methods described above is to be employed, and the like. The amount of calculation required for wireless resource allocation is therefore larger in cooperative transmission than in transmission from a single base station.

The increase in the amount of calculation for wireless resource allocation is a huge problem in putting cooperative transmission into practice because the actual number of resource blocks is large (for example, a number of the maximum resource block in LTE is 110).

To summarize, data transmission in which base stations cooperate with one another has the following two problems. Firstly, the transmission of information necessary for base station cooperation from a wireless communication terminal to a base station cuts into other uses of uplink wireless resources. Secondly, the cooperation scheduler needs to handle a larger amount of calculation.

DETAILED DESCRIPTION OF THE PREFERRED EMBODIMENTS

The premise of description given below on embodiments of this invention is that the choice of multiplexing method follows the example of 3GPP LTE, specifically, OFDMA for downlink data transmission and Single Carrier-Frequency Division Multiple Access (SC-FDMA) for uplink data transmission. However, this invention is not limited to a wireless communication system that uses these methods, and is applicable to other multiplexing methods including CDMA and TDMA.

First Embodiment

In a first embodiment of this invention, a base station requests information necessary for cooperative transmission (hereinafter, referred to as cooperation information) from a wireless communication terminal that has failed to be allocated a wireless resource through single-base station transmission, a cooperation scheduler refers to the collected cooperation information and decides on MU-MIMO transmission, and the base station executes MU-MIMO transmission following the decision. This series of processing steps is described below.

Described first are the overall network configuration and the configurations of a base station and a wireless communication terminal.

Figure 2:
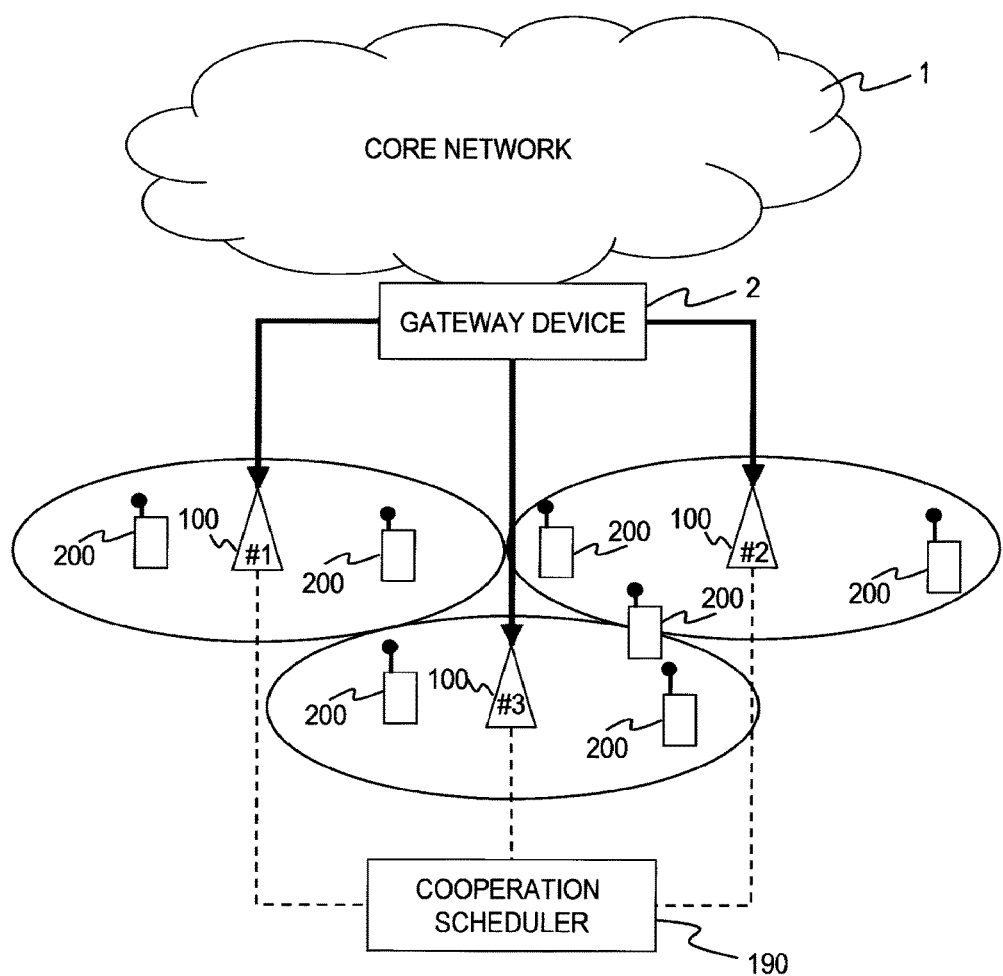
FIG. 2 is a diagram illustrating the configuration of a network according to the first embodiment of this invention.

FIG. 2 is a diagram illustrating the configuration of a network according to the first embodiment of this invention.

The network includes a core network 1, a gateway device 2, base stations 100, and a cooperation scheduler 190.

The base stations 100 each constitute a cell. Wireless communication terminals 200 are scattered within each cell constituted of one base station 100, and each wireless communication terminal 200 belongs to one of the base stations 100.

The base stations 100 are connected to the core network 1 via the gateway device 2. In the first embodiment of this invention, the base stations 100 and the gateway device 2 are connected by cables with the use of optical fibers or the like. It should be noted that the connection between the base station 100 and the gateway device 2 may be wireless.

The cooperation scheduler 190 executes wireless resource allocation in data transmission where the base stations 100 cooperate with one another (hereinafter, referred to as cooperative transmission).

In the first embodiment of this invention, each base station 100 has a communication interface (IF) for communicating with the cooperation scheduler 190.

This invention does not depend on where the cooperation scheduler 190 is set up. For instance, the cooperation scheduler 190 may be set up as an independent device or may be contained in each base station 100 or in the gateway device 2. In the following description of the first embodiment of this invention, where the cooperation scheduler 190 is set up is not specified.

Figure 3:
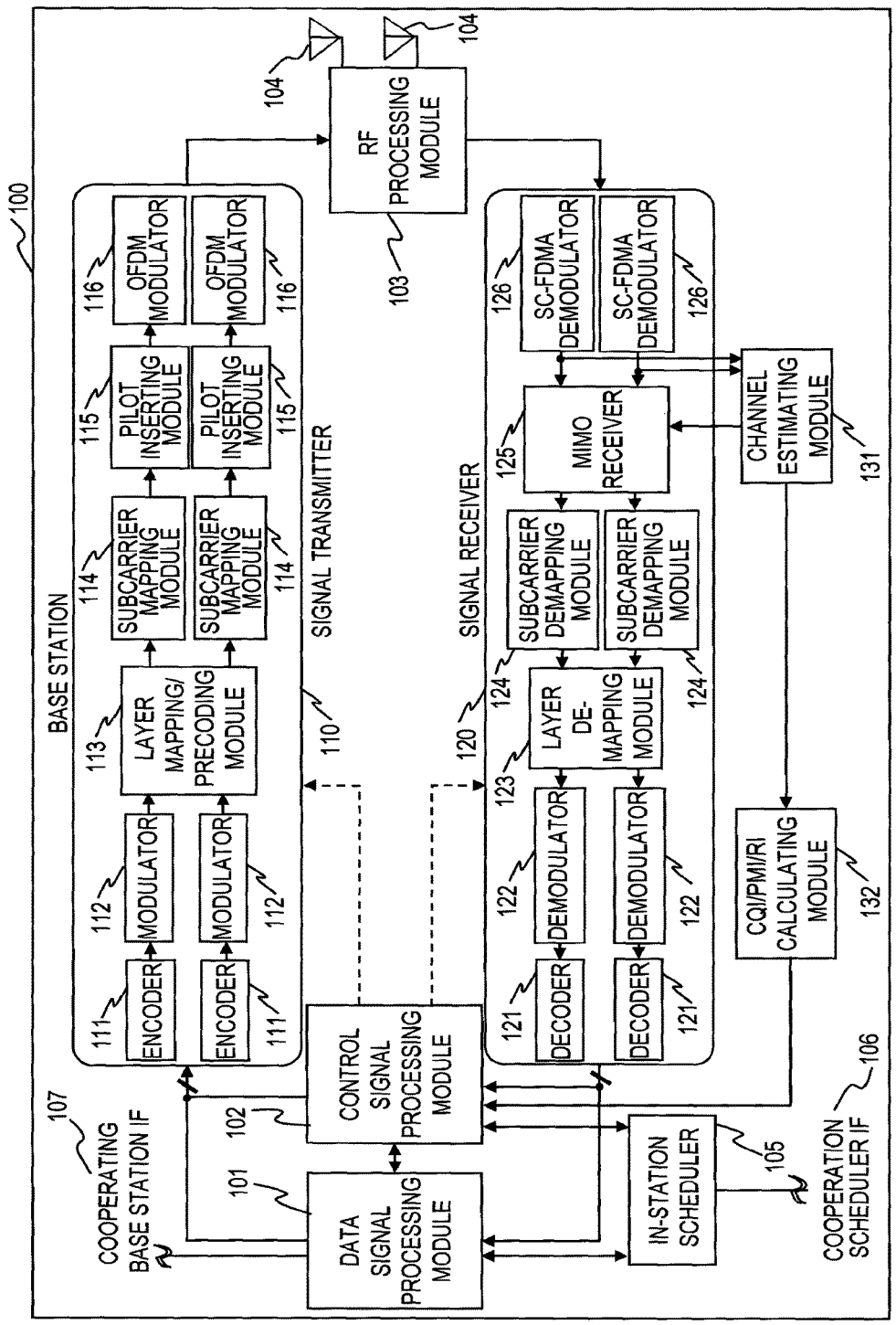
FIG. 3 is a block diagram illustrating the configuration of a base station according to the first embodiment of this invention.

FIG. 3 is a block diagram illustrating the configuration of each base station 100 according to the first embodiment of this invention.

The base station 100 includes a data signal processing module 101, a control signal processing module 102, an RF processing module 103, an antenna 104, an in-station scheduler 105, a cooperation scheduler interface (IF) 106, a cooperating base station interface (IF) 107, a signal transmitter 110, a signal receiver 120, a channel estimation module 131, and a CQI/PMI/RI calculating module 132.

The signal transmitter 110 includes encoders 111, modulators 112, a layer mapping/precoding module 113, subcarrier mapping modules 114, pilot inserting modules 115, and OFDM modulators 116.

The signal receiver 120 includes decoders 121, demodulators 122, an layer demapping module 123, subcarrier demapping modules 124, an MIMO receiver 125, and SC-FDMA demodulators 126.

Processing of the respective components is described below.

User data destined to one of the wireless communication terminals 200 is received from the gateway device 2, accumulated in a buffer of the data signal processing module 101, allocated a wireless resource, and then sent to the signal transmitter 110.

User data sent from the signal receiver 120 to the data signal processing module 101 is transmitted to the core network 1 via the gateway device 2.

The control signal processing module 102 transmits a control signal between the base station 100 and the wireless communication signals 200 via the signal transmitting module 110, or receives the control signal via the signal receiver 120, as the need arises.

The in-station scheduler 105 executes wireless resource allocation for single-base station transmission, performs scheduling based on information received from the data signal processing module 101 and the control signal processing module 102, and notifies the result of the scheduling to the data signal processing module 101 and the control signal processing module 102.

The in-station scheduler 105 also communicates with the cooperation scheduler 190 via the cooperation scheduler IF 106 in order to implement cooperative transmission.

The data signal processing module 101 communicates with other base stations 100 participating in cooperative transmission via the cooperating base station IF 107.

When the signal transmitter 110 receives a data signal from the data signal processing module 101 or a control signal from the control signal processing module 102, one of the encoders 111 generate a code word by attaching a cyclic redundancy code (CRC) to the received data signal or control signal and subsequently performing error correcting coding processing with the use of a turbo code, a convolutional code, or the like.

The modulators 112 each execute appropriate modulation to generate a modulation symbol sequence from a generated code word.

The layer mapping/precoding module 113 executes layer mapping processing for accomplishing antenna diversity and precoding processing for improving the reception precision of the wireless communication terminals 200.

The subcarrier mapping modules 114 each allocate each symbol in a symbol series input from the layer mapping/precoding module 113 to one of subcarriers contained in an arbitrary OFDM symbol.

The pilot inserting modules 115 each insert a pilot symbol, which is used by the wireless communication terminals 200 to estimate the downlink channel, in an appropriate place.

The OFDM modulators 116 each execute inverse discrete Fourier transform (IDFT) processing and cyclic prefix (CP) insertion, and output a baseband OFDM signal.

The output baseband OFDM signal is transmitted to the RF processing module 103, which executes digital-analog conversion, upconverting, and amplification processing for each signal separately, and the signal which has been subjected to the processing given above is transmitted from the antenna 104 to the wireless communication terminals 200.

Meanwhile, signals received by the antenna 104 from the wireless communication terminals 200 are sent to the RF processing module 103, which executes amplification processing, downconverting, and analog-digital conversion processing for each signal. The signals which have been subjected to the processing given above are transmitted to the SC-FDMA demodulators 126.

The SC-FDMA demodulators 126 each execute CP removal, DFT processing, and IDFT processing for SC-FDMA reception for a signal received from the RF processing module 103.

A pilot signal part of the signal which has been subjected to the processing given above is transmitted to the channel estimation module 131, and the rest of the signal is input to the MIMO receiver 125.

The channel estimation module 131 estimates the uplink channel based on the received pilot signal, and transmits the estimated channel matrix to the MIMO receiver 125 and the CQI/PMI/RI calculating module 132.

Based on the received channel matrix, the MIMO receiver 125 executes MIMO reception processing with the use of MMSE and MLD for an input from one of the SC-FDMA demodulators 126, and transmits layer-based outputs to the subcarrier demapping modules 124.

The subcarrier demapping modules 124 execute processing reverse to processing executed by subcarrier mapping modules 214 (illustrated in FIG. 4), which are included in each wireless communication terminal 200. Specifically, the subcarrier demapping modules 124 each generate a reception symbol sequence from a subcarrier contained in an arbitrary OFDMA symbol, and output the generated reception symbol sequence to the layer demapping module 123.

The layer demapping module 123 executes processing reverse to layer mapping processing executed by a layer mapping/precoding module 213 (illustrated in FIG. 4), which is included in each wireless communication terminal 200.

The demodulators 122 each execute demodulation processing for a reception symbol sequence, and outputs a log likelihood ratio sequence to one of the decoders 121.

The decoders 121 each execute error correcting decoding processing and CRC check processing for a log likelihood ratio sequence that has been input, and notify the result of the CRC check to the control signal processing module 102.

When the CRC check resulted in a success, a user data signal is transmitted to the data signal processing module 101, and the control signal is transmitted to the control signal processing module 102.

The CQI/PMI/RI calculating module 132 calculates Channel Quality Indication (CQI, the channel quality), Precoding Matrix Indicator (PMI, a precoding matrix desired by the wireless communication terminal), and Rank Indication (RI, the rank in MIMO transmission) for the uplink, based on a received channel matrix, and notifies calculation results to the control signal processing module 102.

Details of processing executed by the components of the base station 100 are described next.

Figure 6:
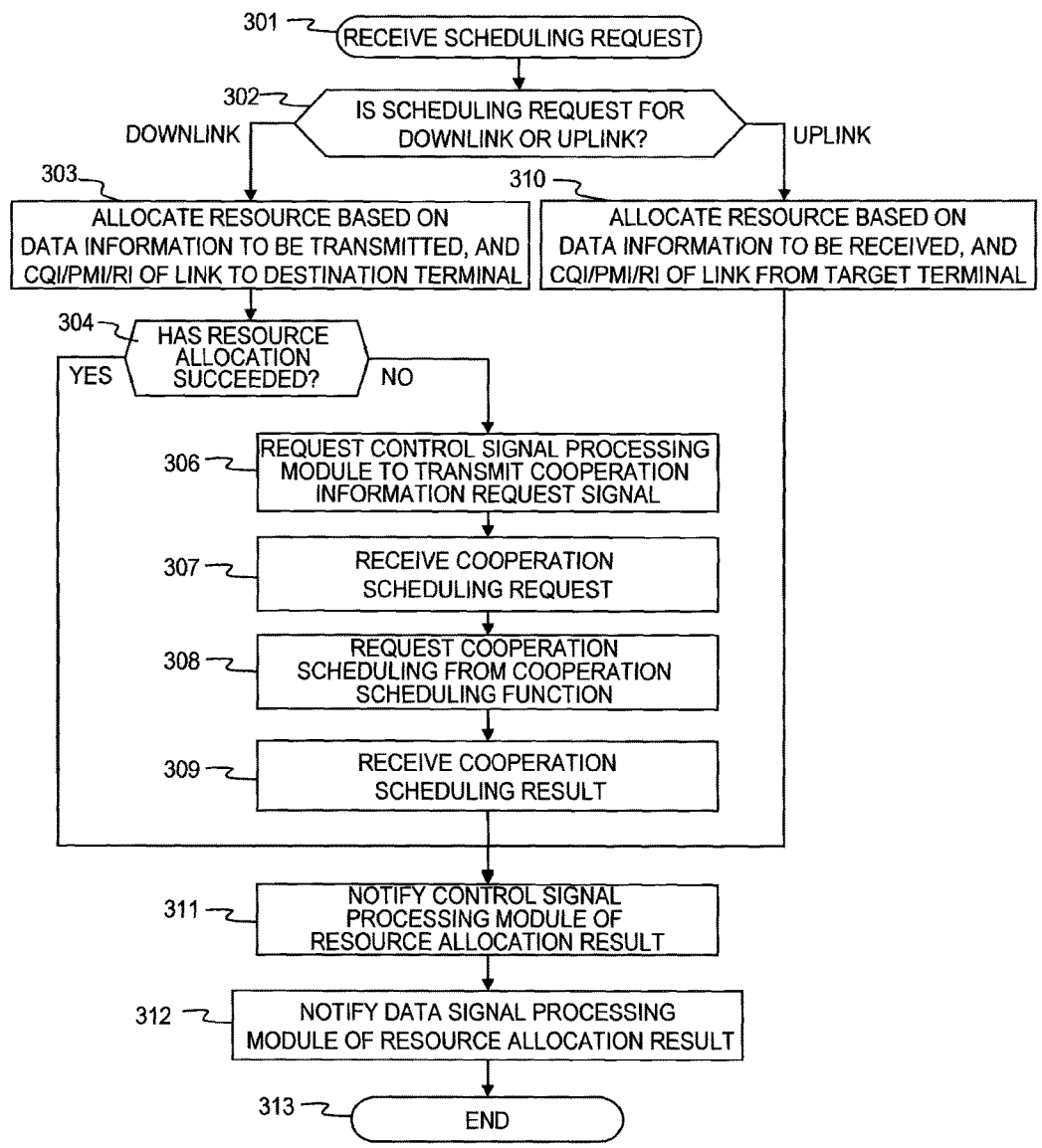
FIG. 6 is a flow chart illustrating processing that is executed when the in-station scheduler receives a scheduling request from the data signal processing module or the control signal processing module according to the first embodiment of this invention.

FIG. 6 is a flow chart illustrating processing that is executed when the in-station scheduler 105 receives a scheduling request from the data signal processing module 101 or the control signal processing module 102 according to the first embodiment of this invention.

The in-station scheduler 105 receives a scheduling request (301) and determines whether the received scheduling request is a downlink scheduling request or an uplink scheduling request (302).

The received scheduling request contains information for identifying whether the scheduling request is for uplink or downlink, and the in-station scheduler 105 refers to this information to determine.

When it is determined that the scheduling request is for downlink, the in-station scheduler 105 allocates wireless resources for single-base station transmission, based on data information to be transmitted and on the Channel Quality Indication (CQI, the channel quality), Precoding Matrix Indicator (PMI, a precoding matrix desired by the wireless communication terminal), and Rank Indication (RI, the rank in MIMO transmission) of a downlink to one of the wireless communication terminals 200 that is the destination of the data information (303). Data information to be transmitted is, for example, the amount of data or a request for the quality of service (QoS) such as delay of data.

The in-station scheduler 105 determines whether or not the wireless resource allocation for single-base station transmission has succeeded or not (304).

When the wireless resource allocation for single-base station transmission is determined as a success, the in-station scheduler 105 notifies the control signal processing module 102 and the data signal processing module 101 of the result of the resource allocation (311 and 312), and ends the processing (313).

When the wireless resource allocation for single-base station transmission is determined as a failure, the in-station scheduler 105 decides that cooperative transmission is necessary, and requests the control signal processing module 102 to transmit a signal that requests information necessary for cooperation (hereinafter, referred to as cooperation information request signal) to the wireless communication terminal 200 that has failed to be allocated a wireless resource through single-base station transmission (306).

The in-station scheduler 105 receives from the control signal processing module 102 a request for wireless resource allocation for cooperative transmission (hereinafter, referred to as cooperation scheduling) (see 324 of FIG. 7A) (307).

Receiving the cooperation scheduling request, the in-station scheduler 105 requests cooperation scheduling from the cooperation scheduler 190 via the cooperation scheduler IF 106.

The in-station scheduler 105 receives a cooperation scheduling result (see 409 of FIG. 10) from the cooperation scheduler 190 (309), notifies the received result to the control signal processing module 102 and the data signal processing module 101 (311 and 312), and ends the processing (313).

When it is determined in Step 302 that the received scheduling request is for uplink, the in-station scheduler 105 allocates uplink wireless resources to the relevant wireless communication terminal 200 based on data information to be received and on the CQI, PMI, and RI of an uplink from the wireless communication terminal 200 (310).

The in-station scheduler 105 subsequently executes the same processing as in the case of a downlink scheduling request, notifies a resource allocation result to the control signal processing module 102 and the data signal processing module 101 (311 and 312), and ends the processing (313).

Figure 7A:
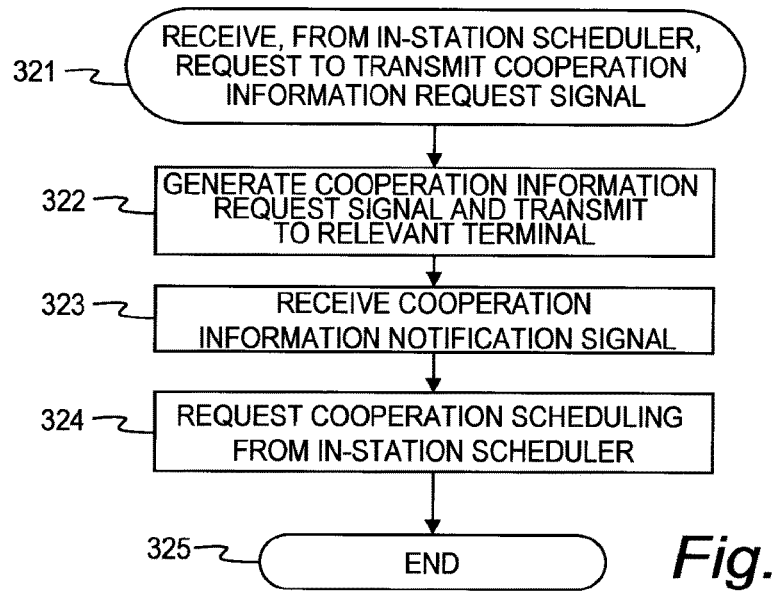
FIG. 7A is a flow chart illustrating processing that is executed when the control signal processing module receives a request to transmit a cooperation information request signal from the in-station scheduler according to the first embodiment of this invention.

FIG. 7A is a flow chart illustrating processing that is executed when the control signal processing module 102 receives a request to transmit a cooperation information request signal from the in-station scheduler 105 according to the first embodiment of this invention.

The control signal processing module 102 receives from the in-station scheduler 105 a request to transmit a cooperation information request signal (see 306 of FIG. 6) (321), generates a cooperation information request signal, and transmits the generated cooperation information request signal to the relevant wireless communication terminal 200 (322). Details of the packet format of the cooperation information request signal are described later with reference to FIG. 11A.

The control signal processing module 102 receives a cooperation information notification signal (see 390 of FIG. 9B) from the wireless communication terminal 200 (323). The cooperation information notification signal is a signal for notifying to the base station 100 information necessary to execute wireless resource allocation for cooperative transmission. The cooperation information notification signal contains a cooperative transmission method desired by the wireless communication terminal 200, a list of the base stations 100 that participate in the cooperative transmission, and at least one type of information out of CQI and a channel matrix in cooperative transmission. Details of the packet format of the cooperation information notification signal are described later with reference to FIGS. 12A and 12B.

The control signal processing module 102 issues a request for cooperation scheduling to the in-station scheduler 105 (324), and ends the processing (325). This request contains the obtained cooperation information.

Figure 7B:
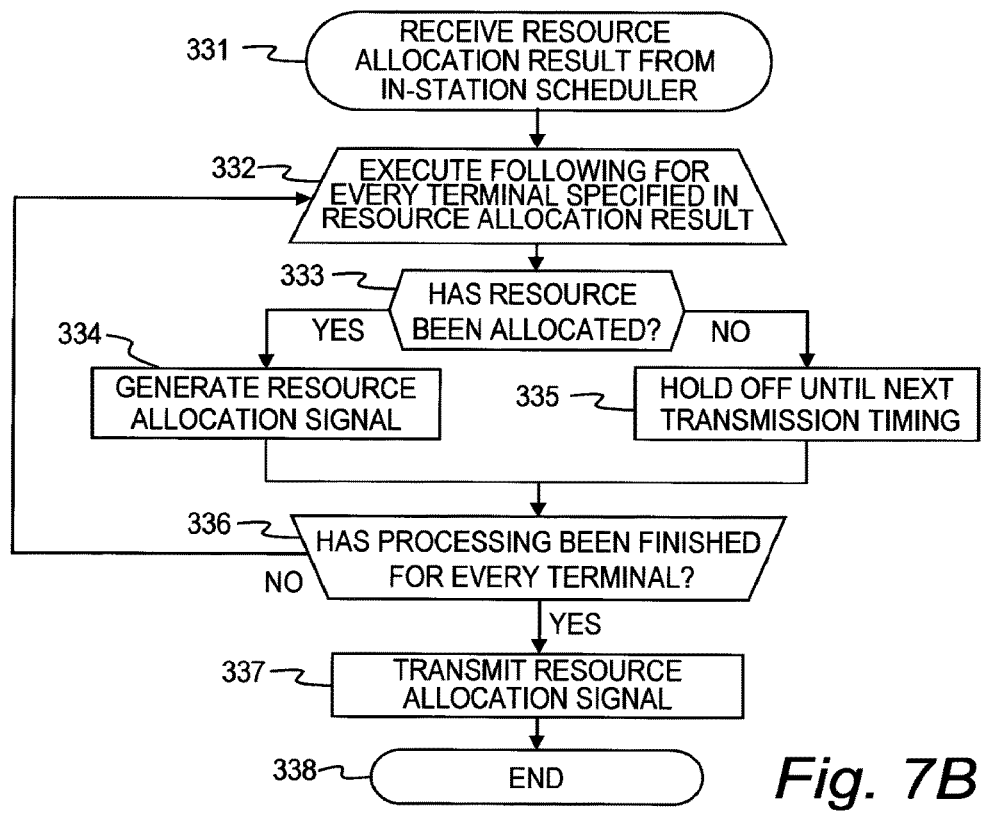
FIG. 7B is a flow chart illustrating processing that is executed when the control signal processing module receives a resource allocation result from the in-station scheduler according to the first embodiment of this invention.

FIG. 7B is a flow chart illustrating processing that is executed when the control signal processing module 102 receives a resource allocation result from the in-station scheduler 105 according to the first embodiment of this invention.

The control signal processing module 102 receives a resource allocation result (see 311 of FIG. 6) from the in-station scheduler 105 (331), and repeatedly executes the following processing steps until every wireless communication terminal 200 that is specified in the received resource allocation result is processed (332). Specifically, the control signal processing module 102 selects one wireless communication terminal 200 from among the wireless communication terminals 200 that are specified in the received resource allocation result, and executes the following processing steps.

The control signal processing module 102 first determines whether or not a wireless resource has been allocated to the selected wireless communication terminal 200 (333).

When it is determined that the selected wireless communication terminal 200 has been allocated a wireless resource, the control signal processing module 102 generates a resource allocation signal (334). The resource allocation signal is a signal for notifying the wireless communication terminal 200 of a wireless resource that has been allocated. Details of the packet format of the resource allocation signal are described later with reference to FIG. 11B.

When it is determined that the selected wireless communication terminal 200 has not been allocated a wireless resource, the control signal processing module 102 holds off data transmission to this wireless communication terminal 200 until the next transmission timing (335). The next transmission timing may be, in the case of LTE, for example, the next time a subframe is transmitted.

The control signal processing module 102 determines whether or not every wireless communication terminal 200 specified in the received resource allocation result has been processed (336).

When it is determined that not every wireless communication terminal 200 specified in the received resource allocation result has been processed, the control signal processing module 102 returns to Step 332 to repeat the subsequent processing steps.

When it is determined that every wireless communication terminal 200 specified in the received resource allocation result has been processed, the control signal processing module 102 transmits generated resource allocation signals to the wireless communication terminals 200 (337), and ends the processing (338).

Figure 7C:
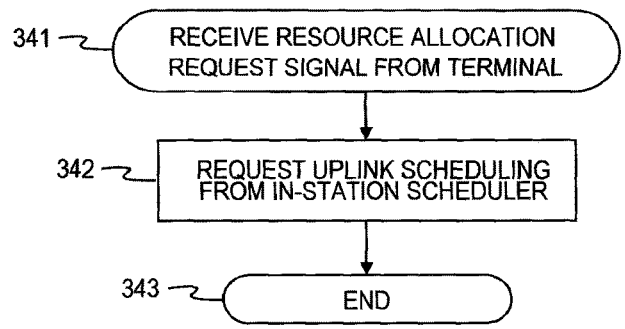
FIG. 7C is a flow chart illustrating processing that is executed when the control signal processing module receives a resource allocation request signal from the wireless communication terminal according to the first embodiment of this invention.

FIG. 7C is a flow chart illustrating processing that is executed when the control signal processing module 102 receives a resource allocation request signal from one of the wireless communication terminals 200 according to the first embodiment of this invention.

The control signal processing module 102 receives a resource allocation request signal from one of the wireless communication terminals 200 (341), requests uplink scheduling from the in-station scheduler 105 (342), and ends the processing (343).

Figure 8A:
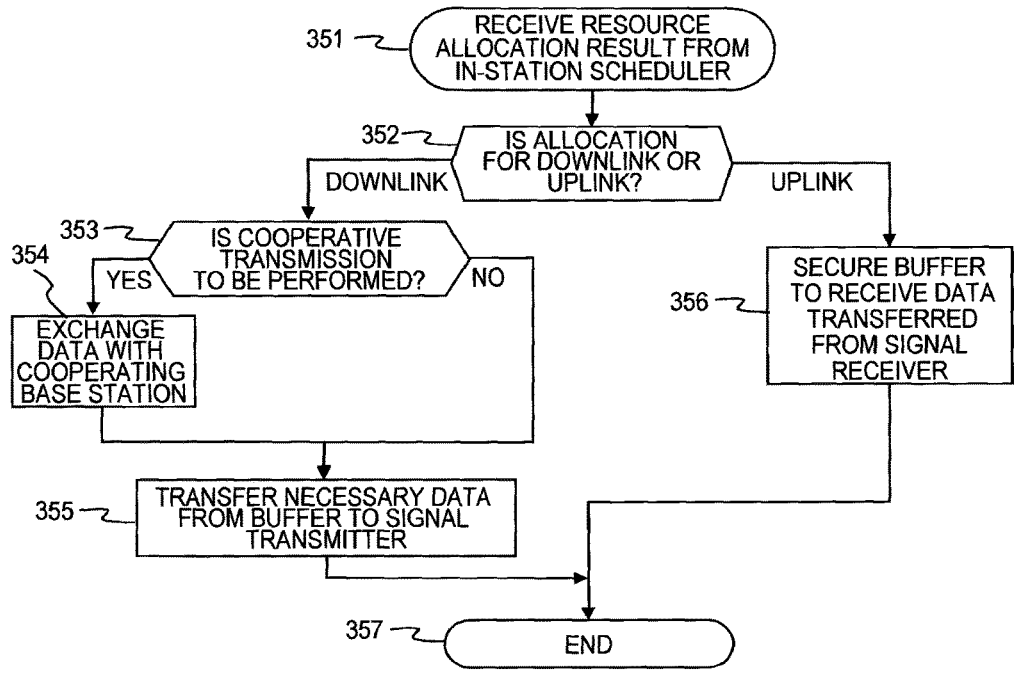
FIG. 8A is a flow chart illustrating processing that is executed when the data signal processing module receives a resource allocation result from the in-station scheduler according to the first embodiment of this invention.

FIG. 8A is a flow chart illustrating processing that is executed when the data signal processing module 101 receives a resource allocation result from the in-station scheduler 105 according to the first embodiment of this invention.

The data signal processing module 101 receives a resource allocation result from the in-station scheduler 105 (351) and determines whether the resource allocation is downlink resource allocation or uplink resource allocation (352).

When it is determined that the resource allocation is for downlink, the data signal processing module 101 refers to the resource allocation result to determine whether or not to perform cooperative transmission (353).

When it is determined that cooperative transmission is not to be performed, the data signal processing module 101 proceeds to Step 355.

When it is determined that cooperative transmission is to be performed, the data signal processing module 101 exchanges necessary user data with other base stations 100 that participate in the cooperative transmission (354), and proceeds to Step 355.

The data signal processing module 101 next transfers necessary data from the buffer in the data signal processing module 101 to the signal transmitting module 110 (355), and ends the processing (357).

When it is determined in Step 352 that the resource allocation is for uplink, the data signal processing module 101 secures a buffer area in preparation for data reception (356), and ends the processing (357).

Figure 8B:
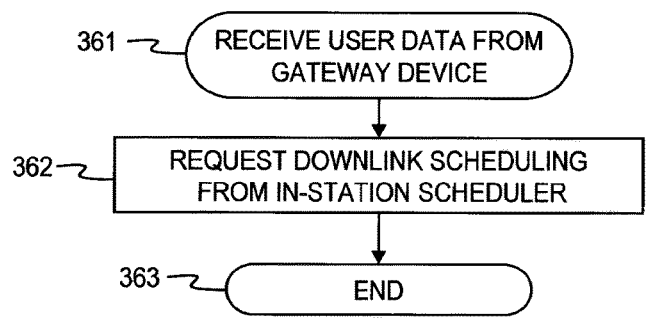
FIG. 8B is a flow chart illustrating processing that is executed when the data signal processing module receives user data that is destined to one of the wireless communication terminals from the gateway device according to the first embodiment of this invention.

FIG. 8B is a flow chart illustrating processing that is executed when the data signal processing module 101 receives user data that is destined to one of the wireless communication terminals 200 from the gateway device 2 according to the first embodiment of this invention.

The data signal processing module 101 receives from the gateway device 2 user data destined to one of the wireless communication terminals 200 (361), requests downlink scheduling from the in-station scheduler 105 (362), and ends the processing (363).

The configuration of each wireless communication terminal 200 is described next.

Figure 4:
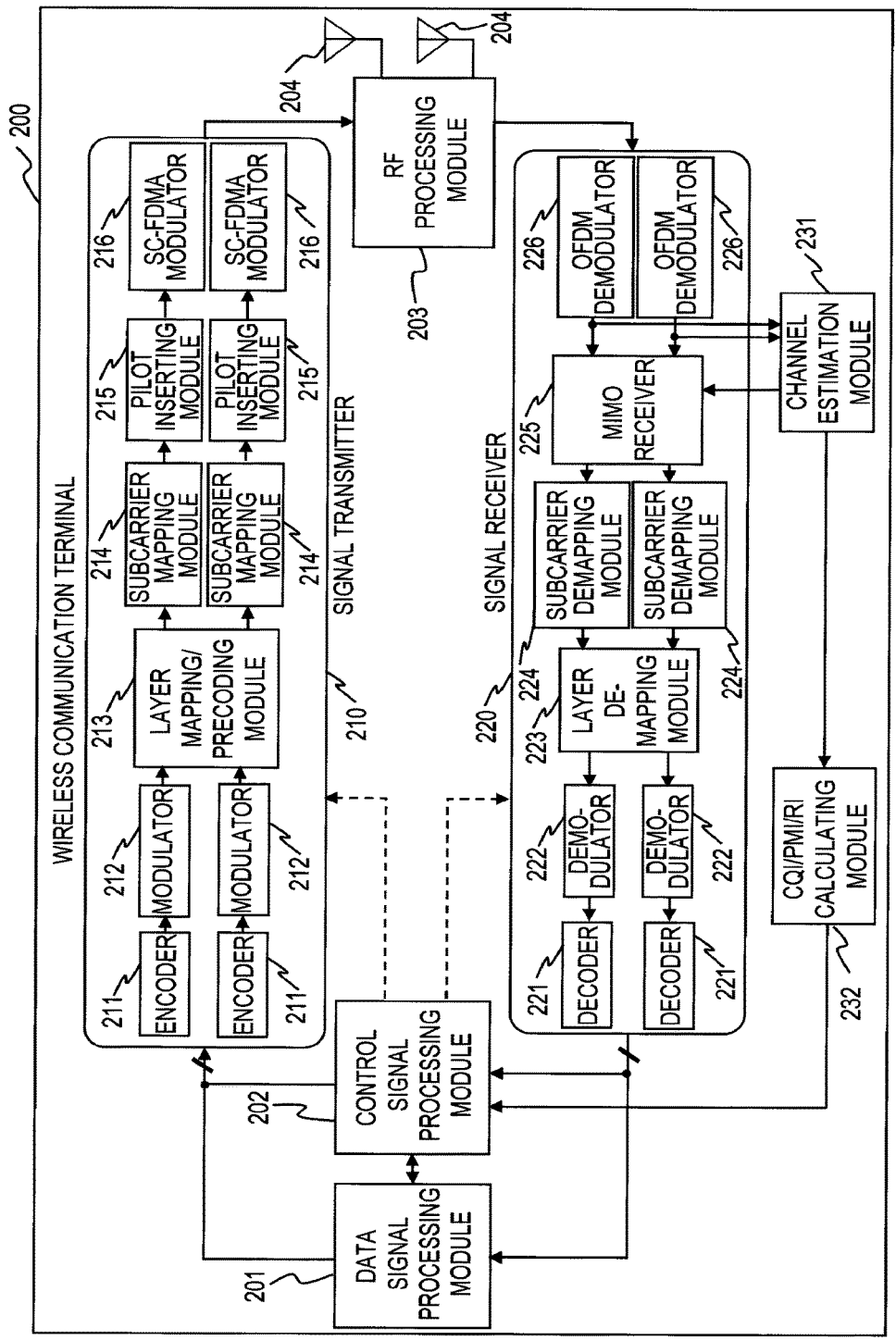
FIG. 4 is a block diagram illustrating the configuration of a wireless communication terminal according to the first embodiment of this invention.

FIG. 4 is a block diagram illustrating the configuration of each wireless communication terminal 200 according to the first embodiment of this invention.

The wireless communication terminal 200 includes a data signal processing module 201, a control signal processing module 202, an RF processing module 203, an antenna 204, a signal transmitter 210, a signal receiver 220, a channel estimation module 231, and a CQI/PMI/RI calculating module 232.

The signal transmitter 210 includes encoders 211, modulators 212, the layer mapping/precoding module 213, the subcarrier mapping modules 214, pilot inserting modules 215, and SC-FDMA modulators 216.

The signal receiver 220 includes decoders 221, demodulators 222, an layer demapping module 223, subcarrier demapping modules 224, an MIMO receiver 225, and OFDM demodulators 226.

Processing of the respective components is described below.

User data that is generated by an upper layer in the wireless communication terminal 200, such as the Medium Access Control (MAC) layer, is accumulated in a buffer in the data signal processing module 201, allocated wireless resources, and then transmitted to the signal transmitter 210.

User data that is sent from the signal receiver 220 to the data signal processing module 201 is handed over to an upper layer.

The control signal processing module 202 transmits a control signal between one of the base stations 100 and the wireless communication terminal 200 via the signal transmitter 210, or receives the control signal via the signal receiver 220, as the need arises.

When the signal transmitter 210 receives a data signal from the data signal processing module 201 or a control signal from the control signal processing module 202, one of the encoders 211 generate a code word by attaching the CRC to the received data signal or control signal and subsequently performing error correcting coding processing with the use of a turbo code, a convolutional code, or the like.

The modulators 212 each execute appropriate modulation to generate a modulation symbol sequence from a generated code word.

The layer mapping/precoding module 213 executes layer mapping processing for accomplishing antenna diversity and precoding processing for improving the reception precision of the base station 100.

The subcarrier mapping module s 214 each allocate each symbol in a symbol series input from the layer mapping/precoding module 213 to one of subcarriers contained in an arbitrary SC-FDMA symbol.

The pilot inserting modules 215 each insert a pilot symbol, which is used by the base station 100 to estimate the uplink channel, in an appropriate place.

The SC-FDMA modulators 216 each execute DFT processing, IDFT processing, and CP insertion for SC-FDMA, and output a baseband SC-FDMA signal.

The output baseband SC-FDMA signal is transmitted to the RF processing module 203, which executes digital-analog conversion, upconverting, and amplification processing for each signal separately, and the signal which has been subjected to the processing given above is transmitted from the antenna 104 to the base station 100.

Meanwhile, signals received by the antenna 204 from the base station 100 are sent to the RF processing module 203, which executes amplification processing, downconverting, and analog-digital conversion processing for each signal. The signals which have been subjected to the processing given above are transmitted to the OFDM demodulators 226.

The OFDM demodulators 226 each execute CP removal and DFT processing for a signal received from the RF processing module 203.

A pilot signal part of the signal which has been subjected to the processing given above is transmitted to the channel estimation module 231, and the rest of the signal is input to the MIMO receiver 225.

The channel estimation module 231 estimates the downlink channel based on the received pilot signal, and transmits the estimated channel matrix to the MIMO receiver 225 and the CQI/PMI/RI calculating module 232.

Based on the received channel matrix, the MIMO receiver 225 executes MIMO reception processing with the use of MMSE and MLD for an input from one of the OFDM demodulators 226, and transmits layer-based outputs to the subcarrier demapping modules 224.

The subcarrier demapping modules 224 execute processing reverse to the processing executed by the subcarrier mapping modules 114, which are included in each base station 100. Specifically, the subcarrier demapping modules 224 each generate a reception symbol sequence from a subcarrier contained in an arbitrary SC-FDMA symbol, and output the generated reception symbol sequence to the layer demapping module 223.

The layer demapping module 223 executes processing reverse to the layer mapping processing executed by the layer mapping/precoding module 113, which is included in each base station 100.

The demodulators 222 each execute demodulation processing for a reception symbol sequence, and outputs a log likelihood ratio sequence to one of the decoders 221.

The decoders 221 each execute error correcting decoding processing and CRC check processing for a log likelihood ratio sequence that has been input, and notify the result of the CRC check to the control signal processing module 202.

When the CRC check resulted in a success, a user data signal is transmitted to the data signal processing module 201, and the control signal is transmitted to the control signal processing module 202.

The CQI/PMI/RI calculating module 232 calculates CQI, PMI, and RI for the downlink, based on a received channel matrix, and notifies calculation results to the control signal processing module 202.

Details of processing executed by the components of the wireless communication terminals 200 are described next.

Figure 9A:
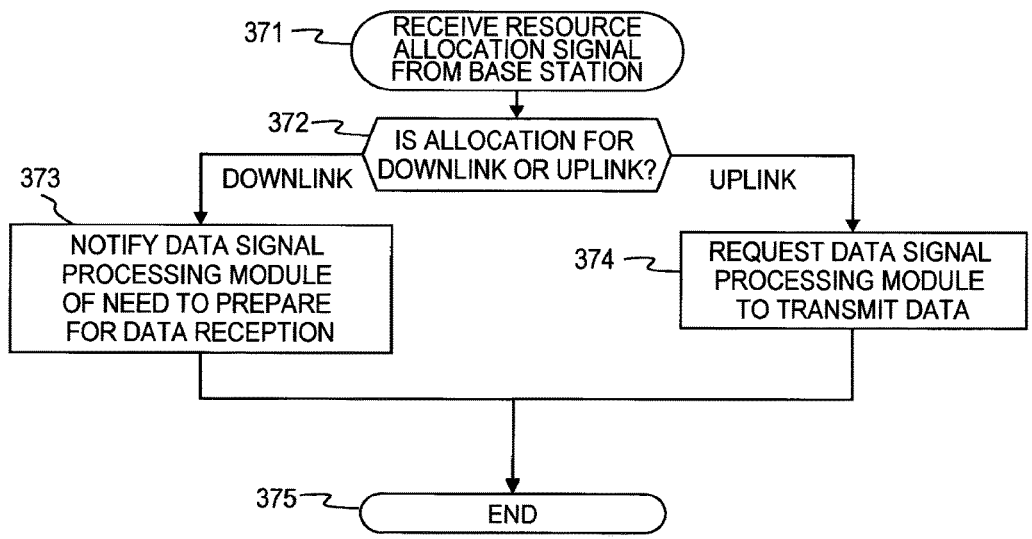
FIG. 9A is a flow chart illustrating processing that is executed when the control signal processing module receives a resource allocation signal from the base station according to the first embodiment of this invention.

FIG. 9A is a flow chart illustrating processing according to the first embodiment of this invention that is executed when the control signal processing module 202 receives a resource allocation signal from one of the base stations 100.

The control signal processing module 202 receives a resource allocation signal from one of the base stations 100

(371), and determines whether the received resource allocation signal is about downlink resource allocation or uplink resource allocation (372).

When it is determined that the received resource allocation signal is about downlink resource allocation, the control signal processing module 202 notifies the data signal processing module 201 of the need to prepare for data reception (373), and ends the processing (375).

When it is determined that the received resource allocation signal is about uplink resource allocation, the control signal processing module 202 requests the data signal processing module 201 to transmit data (374), and ends the processing (375).

Figure 9B:
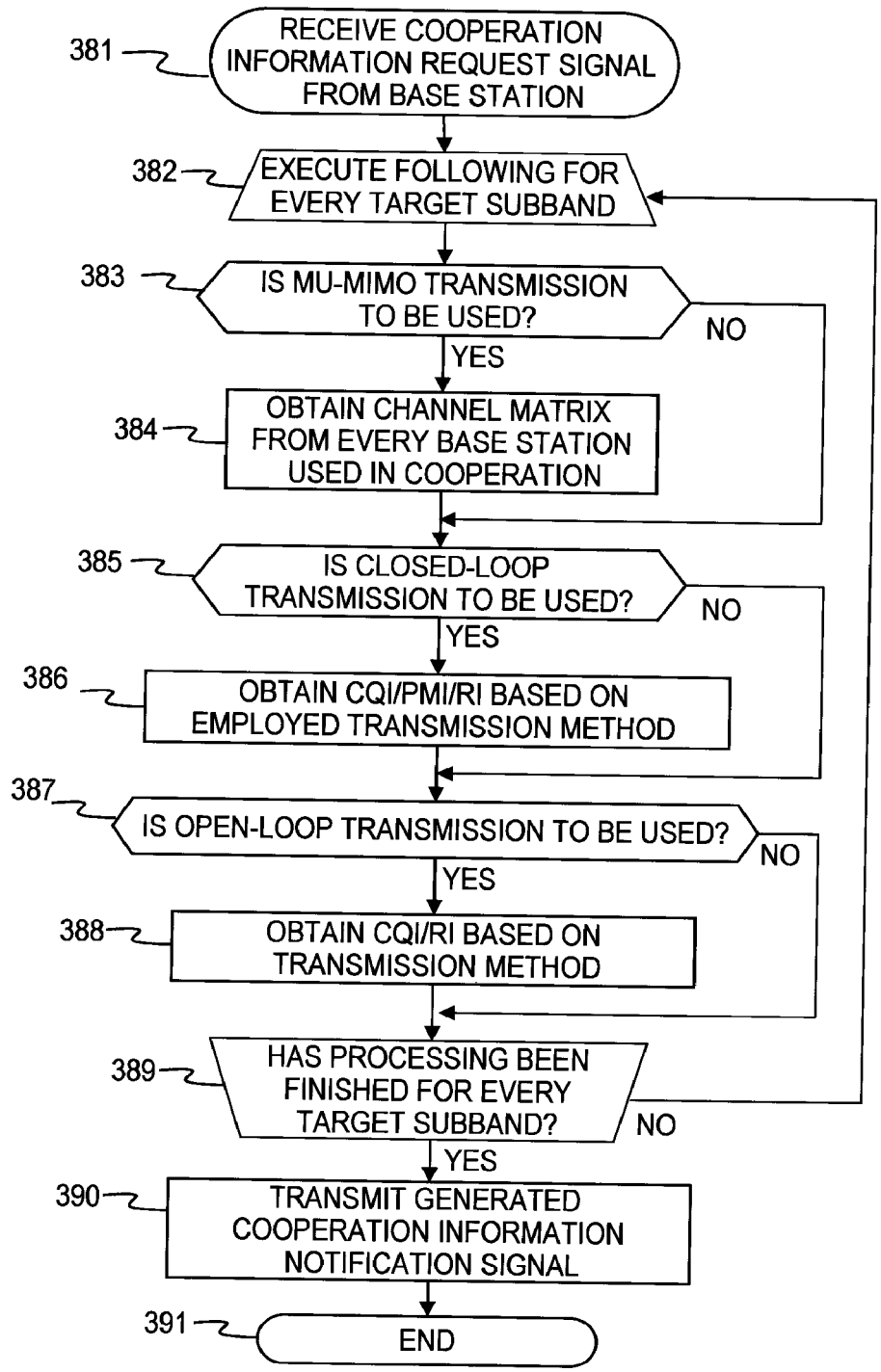
FIG. 9B is a flow chart illustrating processing that is executed when the control signal processing module receives a cooperation information request signal from the base stations according to the first embodiment of this invention.

FIG. 9B is a flow chart illustrating processing according to the first embodiment of this invention that is executed when the control signal processing module 202 receives a cooperation information request signal from one of the base stations 100.

In this flow chart, cooperation information is generated for every target subband to transmit a cooperation information notification signal.

The control signal processing module 202 receives a cooperation information request signal from one of the base stations 100 (381), and repeatedly executes the following processing steps until every target subband is processed (382). Specifically, the control signal processing module 202 selects one subband from among all target subbands, and executes the following processing steps.

The control signal processing module 202 determines whether or not to use MU-MIMO transmission as the transmission method to be used in cooperative transmission (383).

For example, in the case where the cooperation information request signal contains a field that indicates a transmission method to be used in cooperative transmission, the control signal processing module 202 determines whether or not to use MU-MIMO transmission by referring to this field. Alternatively, whether or not to use MU-MIMO transmission may be determined by the wireless communication terminal 200 based on a channel matrix of the downlink and on settings of the wireless communication terminal 200 itself.

When it is determined that MU-MIMO transmission is to be used as the transmission method of the cooperative transmission, the control signal processing module 202 obtains a channel matrix from every base station 100 that participates in the cooperative transmission (384).

When it is determined that MU-MIMO transmission is not to be used as the transmission method of the cooperative transmission, the control signal processing module 202 proceeds to Step 385.

The control signal processing module 202 next determines whether or not to use Closed-Loop transmission as the transmission method of the cooperative transmission (385). As in Step 383, whether or not to use Closed-Loop transmission is determined by referring to a field in the cooperation information request signal, or based on a determination result of the wireless communication terminal 200.

When it is determined that Closed-Loop transmission is to be used as the transmission method of the cooperative transmission, the control signal processing module 202 obtains CQI, PMI, and RI that are based on the employed transmission method from the CQI/PMI/RI calculating module 232 (386).

When it is determined that Closed-Loop transmission is not to be used as the transmission method of the cooperative transmission, the control signal processing module 202 proceeds to Step 387.

The control signal processing module 202 next determines whether or not to use Open-Loop transmission as the transmission method of the cooperative transmission (387). As in Step 383, whether or not to use Open-Loop transmission is determined by referring to a field in the cooperation information request signal, or based on a determination result of the wireless communication terminal 200.

When it is determined that Open-Loop transmission is to be used as the transmission method of the cooperative transmission, the control signal processing module 202 obtains CQI and RI that are based on the employed transmission method from the CQI/PMI/RI calculating module 232 (388).

When it is determined that Open-Loop transmission is not to be used as the transmission method of the cooperative transmission, the control signal processing module 202 proceeds to Step 389.

The control signal processing module 202 next determines whether or not every target subband has been processed (389).

When it is determined that not every target subband has been processed, the control signal processing module 202 returns to Step 382 to repeat the subsequent processing steps.

When it is determined that every target subband has been processed, the control signal processing module 202 generates a cooperation information notification signal based on the obtained cooperation information, transmits the generated cooperation information notification signal to the base station 100 (390), and ends the processing (391).

The cooperation scheduler 190 is described next.

Figures 5A, 5B:
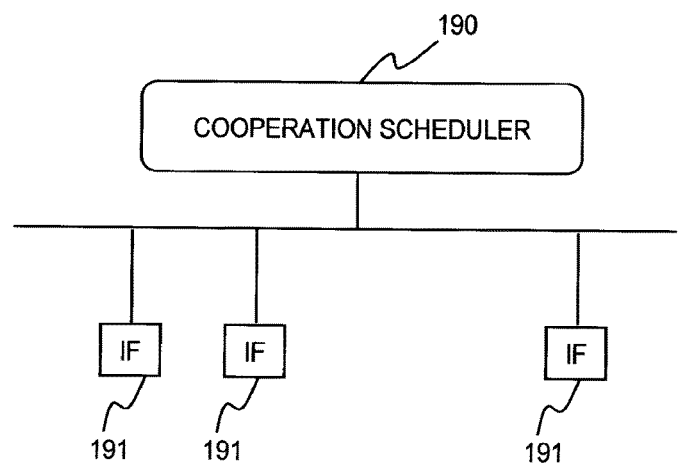
FIG. 5A is a block diagram illustrating the configuration of the cooperation scheduler according to the first embodiment of this invention.
FIG. 5B is a diagram illustrating a database included in the cooperation scheduler according to the first embodiment of this invention.

FIG. 5A is a block diagram illustrating the configuration of the cooperation scheduler 190 according to the first embodiment of this invention.

The cooperation scheduler 190 is connected to the cooperation scheduler IF 106 of each base station 100 via one of IFs 191 to communicate with the in-station scheduler 105. The connection between the IFs 191 and the cooperation scheduler IFs 106 may be cable connection or may be wireless.

FIG. 5B is a diagram illustrating a database included in the cooperation scheduler 190 according to the first embodiment of this invention.

The cooperation scheduler 190 refers to this database, which is denoted by 550, when allocating wireless resources.

The database 550 contains in each entry a terminal 551, a data arrival time 552, a data amount 553, and cooperation instantaneous throughput 554, and average throughput 555.

The terminal 551 stores an identifier for uniquely identifying each wireless communication terminal 200. Stored as the data arrival time 552 is a time at which user data destined to the wireless communication terminal 200 that is associated with the terminal 551 arrives at the relevant base station 100.

The data amount 553 includes the data amount of the user data destined to the wireless communication terminal 200 that is associated with the terminal 551. The cooperation instantaneous throughput 554 includes the instantaneous throughput in cooperative transmission. The average throughput 555 includes the average throughput in the transmission of user data destined to the wireless communication terminal 200 that is associated with the terminal 551.

The cooperation scheduler 190 calculates the amount of wireless resource necessary to transmit user data based on the data arrival time 552 and the data amount 553, and determines the priority of each wireless communication terminal 200 based on the cooperation instantaneous throughput 554 and the average throughput 555.

The priority may be determined by a method that uses proportional fairness to select first the wireless communication terminal 200 that has the largest quotient of the cooperation instantaneous throughput 554 divided by the average throughput 555. The database 550 of FIG. 5B is an example, and the database 550 may have other configurations.

Figure 10:
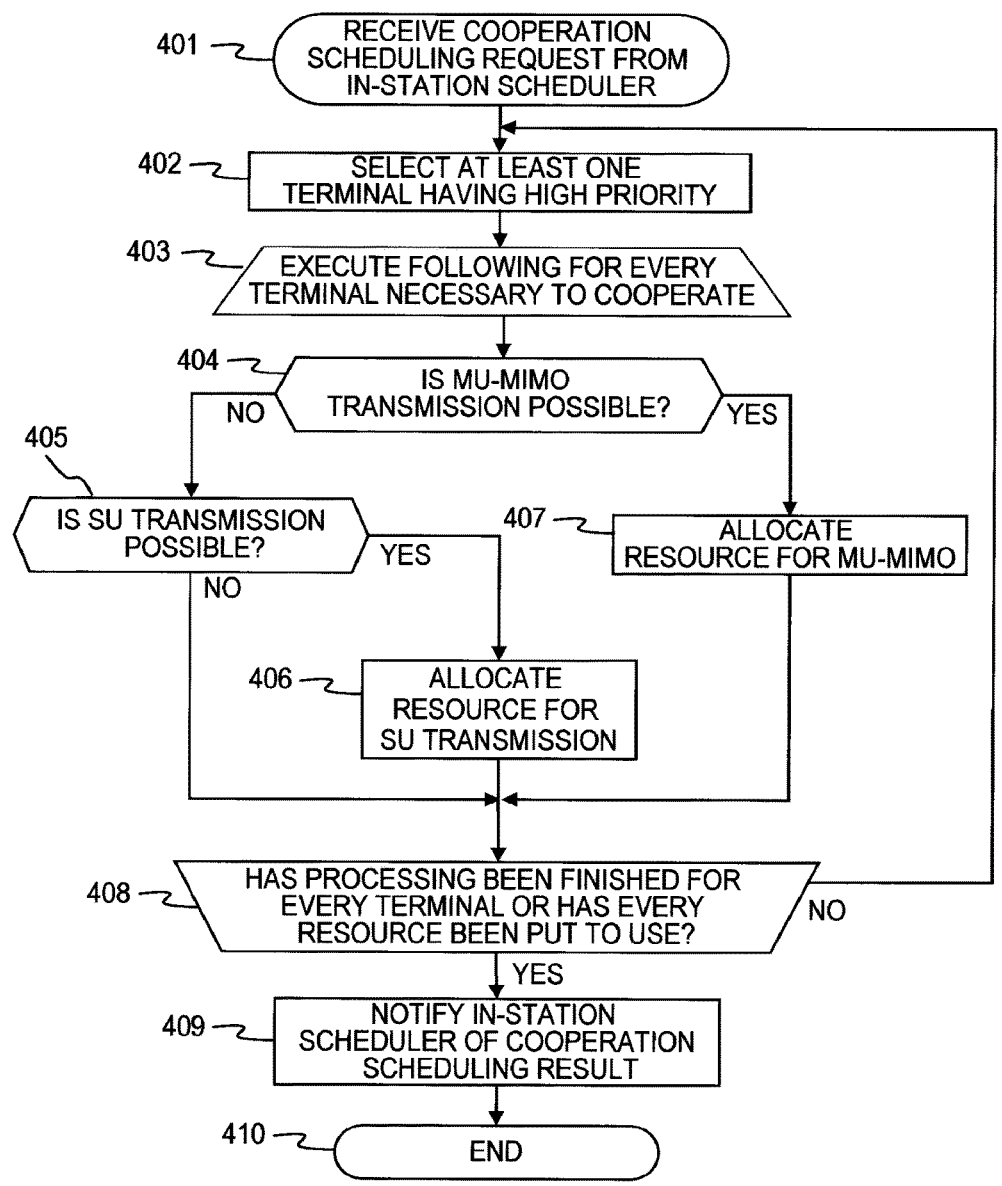
FIG. 10 is a flow chart illustrating processing that is executed when the cooperation scheduler receives a cooperation scheduling request from the in-station scheduler according to the first embodiment of this invention.

FIG. 10 is a flow chart illustrating processing according to the first embodiment of this invention that is executed when the cooperation scheduler 190 receives a cooperation scheduling request from the in-station scheduler 105.

The cooperation scheduling 190 receives a cooperation scheduling request from the in-station scheduler 105 (401), and selects at least one wireless communication terminal 200 that has high priority (402). The selection may be made by, for example, a method that uses proportional fairness and the database of FIG. 5B.

The cooperation scheduler 190 repeatedly executes the following processing steps until every selected wireless communication terminal 200 is processed (400). Specifically, the cooperation scheduling 190 selects one wireless communication terminal 200 from among the wireless communication terminals 200 that have been selected in Step 402, and executes the following processing steps.

The cooperation scheduling 190 first refers to the database of FIG. 5B to determine whether or not MU-MIMO transmission is possible (404).

When it is determined that MU-MIMO transmission is possible, the cooperation scheduler 190 allocates wireless resources for MU-MIMO transmission (407) and proceeds to Step 408.

When it is determined that MU-MIMO transmission is not possible, the cooperation scheduler 190 determines whether or not SU transmission is possible (405).

When it is determined that SU transmission is possible, the cooperation scheduler 190 allocates wireless resources for SU transmission (406) and proceeds to Step 408.

When it is determined that SU transmission is not possible, the cooperation scheduler 190 proceeds to Step 408.

The cooperation scheduler 190 determines whether or not every wireless communication terminal 200 selected in Step 402 has been processed, or whether or not every wireless resource that is available for allocation has been put into use (408).

When it is determined that the criterion given above is not satisfied, the cooperation scheduler 190 returns to Step 402 to repeat the subsequent processing steps.

When it is determined that the criterion given above is satisfied, the cooperation scheduler 190 notifies the result of the wireless resource allocation as a cooperation scheduling result to the in-station scheduler 105 (409), and ends the processing (410).

The flow chart of the processing of the cooperation scheduler 190 is an example, and the cooperation scheduler 190 may process a cooperation scheduling request based on other scheduling standards.

The formats of packets necessary for data transmission in which the base stations 100 cooperate with one another are described next with reference to FIGS. 11A and 11B and FIGS. 12A and 12B.

Figure 11A:
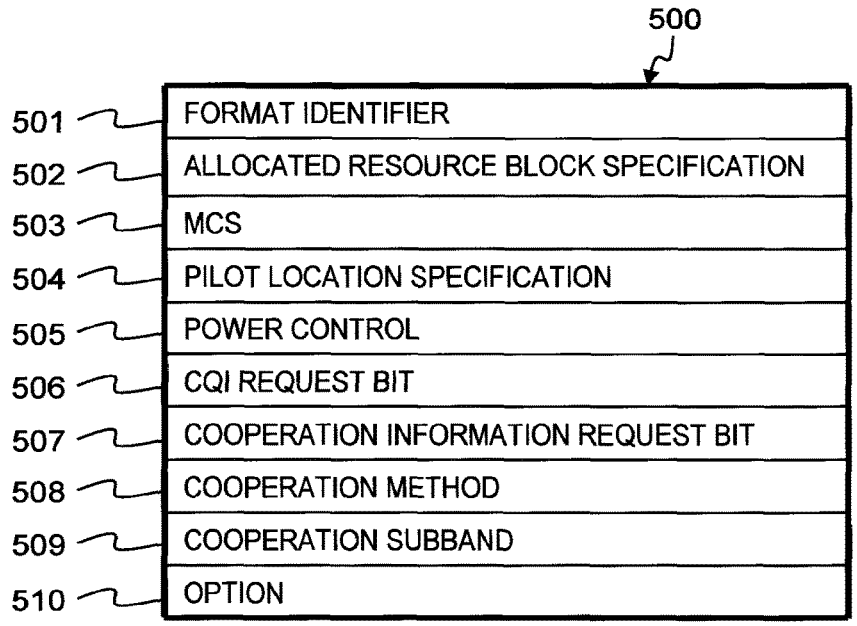
FIG. 11A is a diagram illustrating the packet format of the cooperation information request signal according to the first embodiment of this invention.

FIG. 11A is a diagram illustrating the packet format of the cooperation information request signal according to the first embodiment of this invention.

A packet format 500 of the cooperation information request signal contains a format identifier field 501, an allocated resource block specification field 502, an MCS field 503, a pilot location specification field 504, a power control field 505, a CQI request bit field 506, a cooperation information request bit field 507, a cooperation method field 508, a cooperation subband field 509, and an option field 510.

The format identifier field 501 is a field for distinguishing the packet format from other wireless resource allocation formats. The allocated resource block specification field 502 is a field for specifying the location of an uplink resource block that is used to transmit cooperation information. A resource block in this case equals a plurality of consecutive SC-FDMA symbols and a plurality of consecutive subcarriers in the SC-FDMA symbols, and uplink wireless resources are allocated on a resource block basis.

The MCS field 503 is a field for specifying a modulation and coding scheme, and MCS stands for Modulation and Coding Scheme. The pilot location specification field 504 is a field for information about where a pilot is to be inserted by the destination wireless communication terminal 200.

The power control field 505 is a field for information about power control of the wireless communication terminal 200. The CQI request bit field 506 is a field for requesting feedback of CQI from the wireless communication terminal 200. Specifically, "1" is stored in the power control field 505 in the case of a cooperation information request signal.

The cooperation information request bit field 507 is a field for indicating whether or not this signal is a cooperation information request signal. Specifically, "1" is stored in the cooperation information request bit field 507 in the case of a cooperation information request signal.

The packet format 500 contains the cooperation method field 508 and the cooperation subband field 509 when "1" is stored in the cooperation information request bit field 507, and does not contain the cooperation method field 508 and the cooperation subband field 509 when "0" is stored in the cooperation information request bit field 507.

The cooperation method field 508 is used in the case where the sender base station 100 or the cooperation scheduler 190 specifies a transmission method to be employed for cooperation. The cooperation subband field 509 is used in the case where the sender base station 100 or the cooperation scheduler 190 specifies a subband to be employed for cooperation. The option field 510 can be used for other expansions.

Figure 11B:
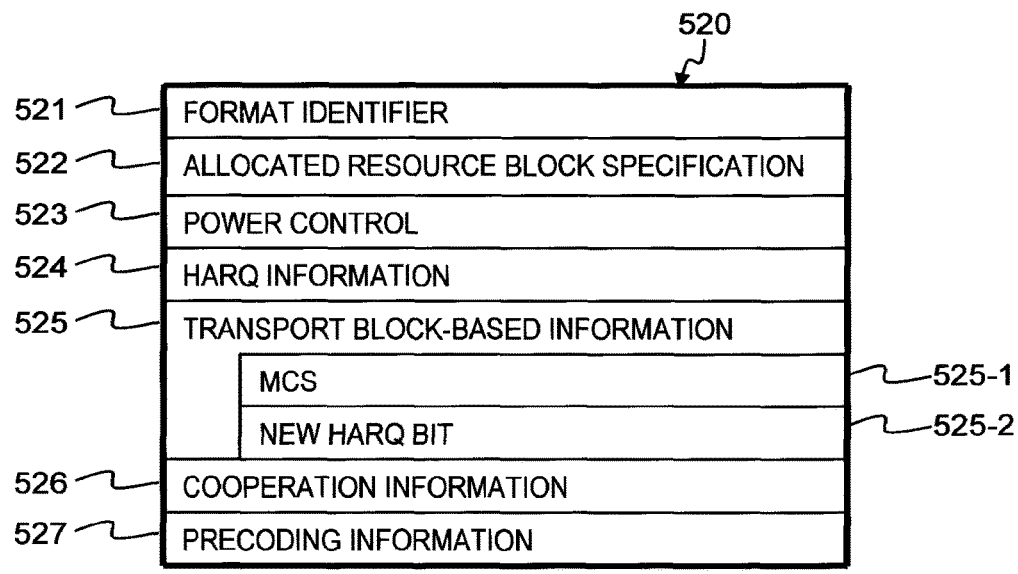
FIG. 11B is a diagram illustrating the packet format of the resource allocation signal according to the first embodiment of this invention.

FIG. 11B is a diagram illustrating the packet format of the resource allocation signal according to the first embodiment of this invention.

A packet format 520 of the resource allocation signal contains a format identifier field 521, an allocated resource block specification field 522, a power control filed 523, a HARQ information field 524, a transport block-based information field 525, a cooperation information field 526, and a precoding information field 527.

The format identifier field 521 is a field for distinguishing the packet format from other wireless resource allocation formats. The allocated resource block specification field 522 is a field for specifying the location of a downlink resource block that is used to transmit data to the destination wireless communication terminal 200 through cooperation among the base stations 100. A resource block in this case equals a plurality of consecutive OFDMA symbols and a plurality of consecutive subcarriers in the OFDMA symbols, and downlink wireless resources are allocated on a resource block basis.

The power control field 523 is a field for information about power control of the wireless communication terminal 200. The HARQ information field 524 is a field for notifying a process number in Hybrid Automatic Repeat Request (HARQ) transmission.

The packet format 520 contains as many transport block-based information fields 525 as the number of transport blocks to be transmitted. Each transport block-based information field 525 contains an MCS field 525-1 for specifying a modulation and coding scheme for each transport block and a new HARQ field 525-2 for distinguishing whether or not the transmission in question is new HARQ transmission.

The cooperation information field 526 is a field for information about which base stations participate in the cooperative transmission and what transmission method is used in the cooperative transmission. The precoding information field 527 is a field for information about the index and quantized values of a precoding matrix that is used in the cooperative transmission.

Figure 12A:
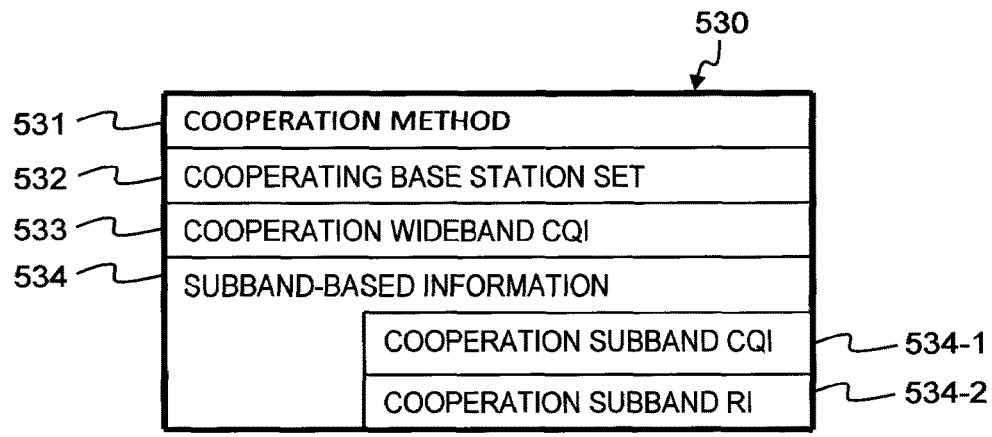
FIG. 12A is a diagram illustrating the packet format of a cooperation information notification signal for Open-Loop MIMO according to the first embodiment of this invention.

FIG. 12A is a diagram illustrating the packet format of a cooperation information notification signal for Open-Loop MIMO according to the first embodiment of this invention.

A packet format 530 of the cooperation information notification signal for Open-Loop MIMO contains a cooperation method field 531, a cooperating base station set field 532, a cooperation wideband CQI field 533, and a subband-based information field 534.

The cooperation method field 531 is a field for specifying a transmission method to be used in the cooperative transmission. The cooperating base station set field 532 is a field for notifying a set of the base stations 100 that participate in the cooperative transmission. The cooperation wideband CQI field 533 is a field for notifying CQI on every OFDMA subcarrier in the cooperative transmission that uses the method specified in the cooperation method field 531.

The packet format 530 contains as many subband-based information fields 534 as the number of subbands. Each subband-based information field 534 contains a cooperation subband CQI field 534-1 for storing the CQI of each subband in cooperative transmission, and a cooperation subband RI field 534-2 for storing the RI of each subband in cooperative transmission.

Figure 12B:
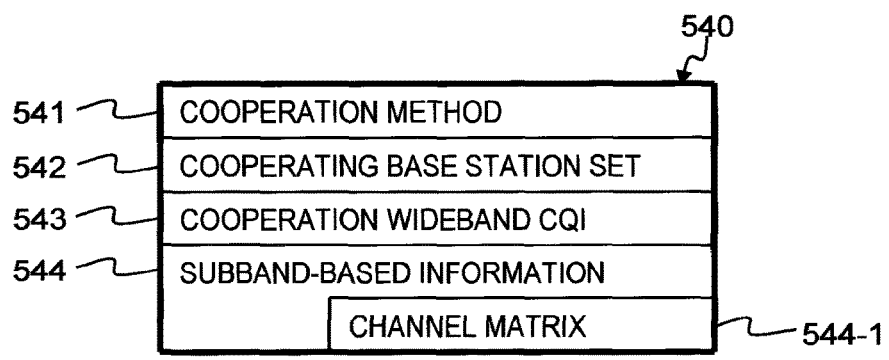
FIG. 12B is a diagram illustrating the packet format of a cooperation information notification signal for MU-MIMO according to the first embodiment of this invention.

FIG. 12B is a diagram illustrating the packet format of a cooperation information notification signal for MU-MIMO according to the first embodiment of this invention.

A packet format 540 of the cooperation information notification signal for MU-MIMO contains a cooperation method field 541, a cooperating base station set field 542, a cooperation wideband CQI field 543, and a subband-based information field 544.

The cooperation method field 541 is a field for specifying a transmission method to be used in the cooperative transmission. The cooperating base station set field 542 is a field for notifying a set of base stations that participate in the cooperative transmission. The cooperation wideband CQI field 543 is a field for notifying CQI on every OFDMA subcarrier in the cooperative transmission that uses the method specified in the cooperation method field 541.

The packet format 540 contains as many subband-based information fields 544 as the number of subbands. Each subband-based information field 544 contains a channel matrix field 544-1 for storing values of a quantized propagation matrix between the base stations 100 that are specified in the cooperating base station set field 542 and the wireless communication terminals 200.

Figure 1:
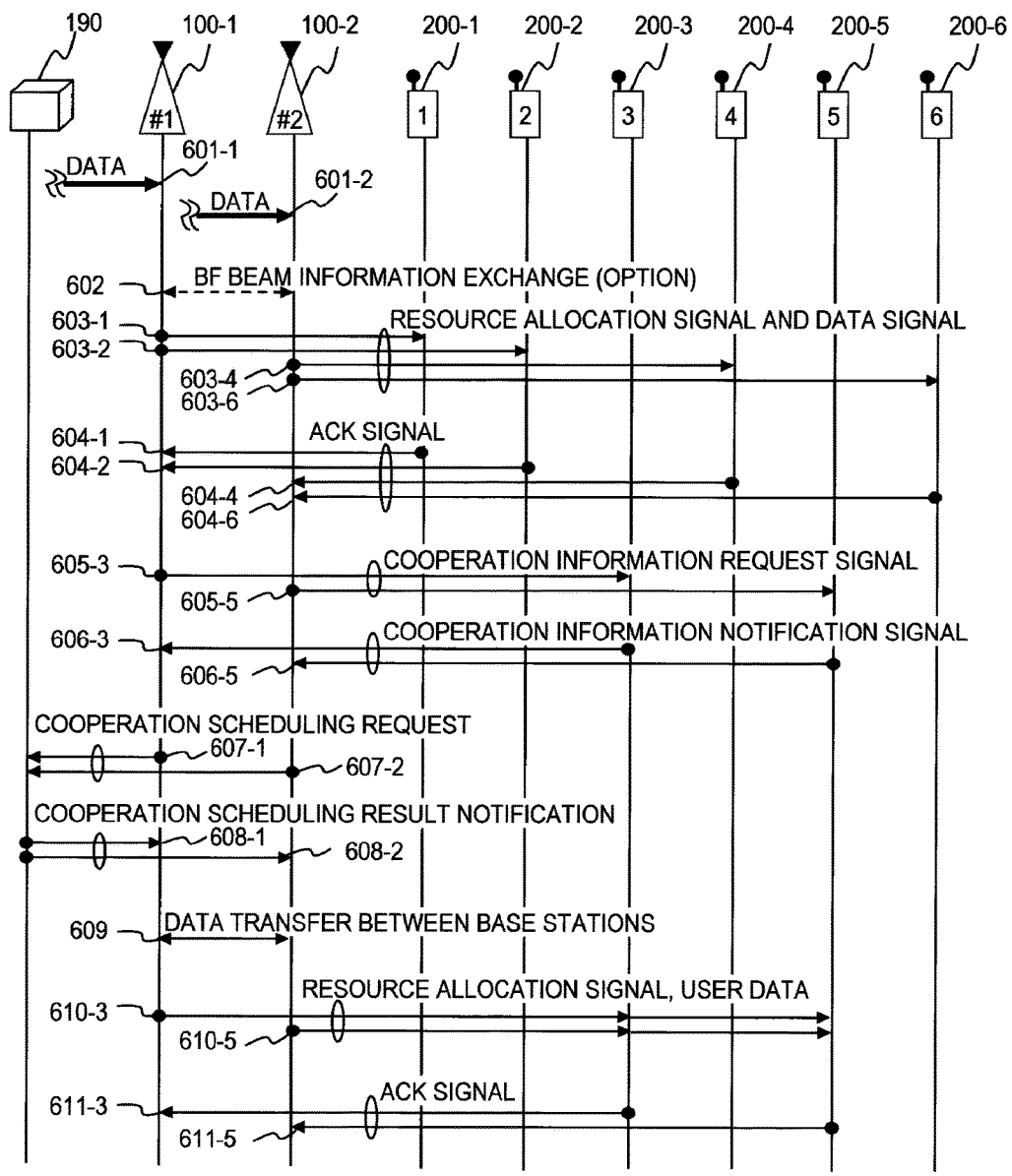
FIG. 1 is a sequence diagram illustrating processing that is executed after the sequence of FIG. 13, form a reception of user data destined to the wireless communication terminal by the base station from the gateway device, to a cooperative transmission through MU-MIMO transmission according to the first embodiment of this invention.
Figure 13:
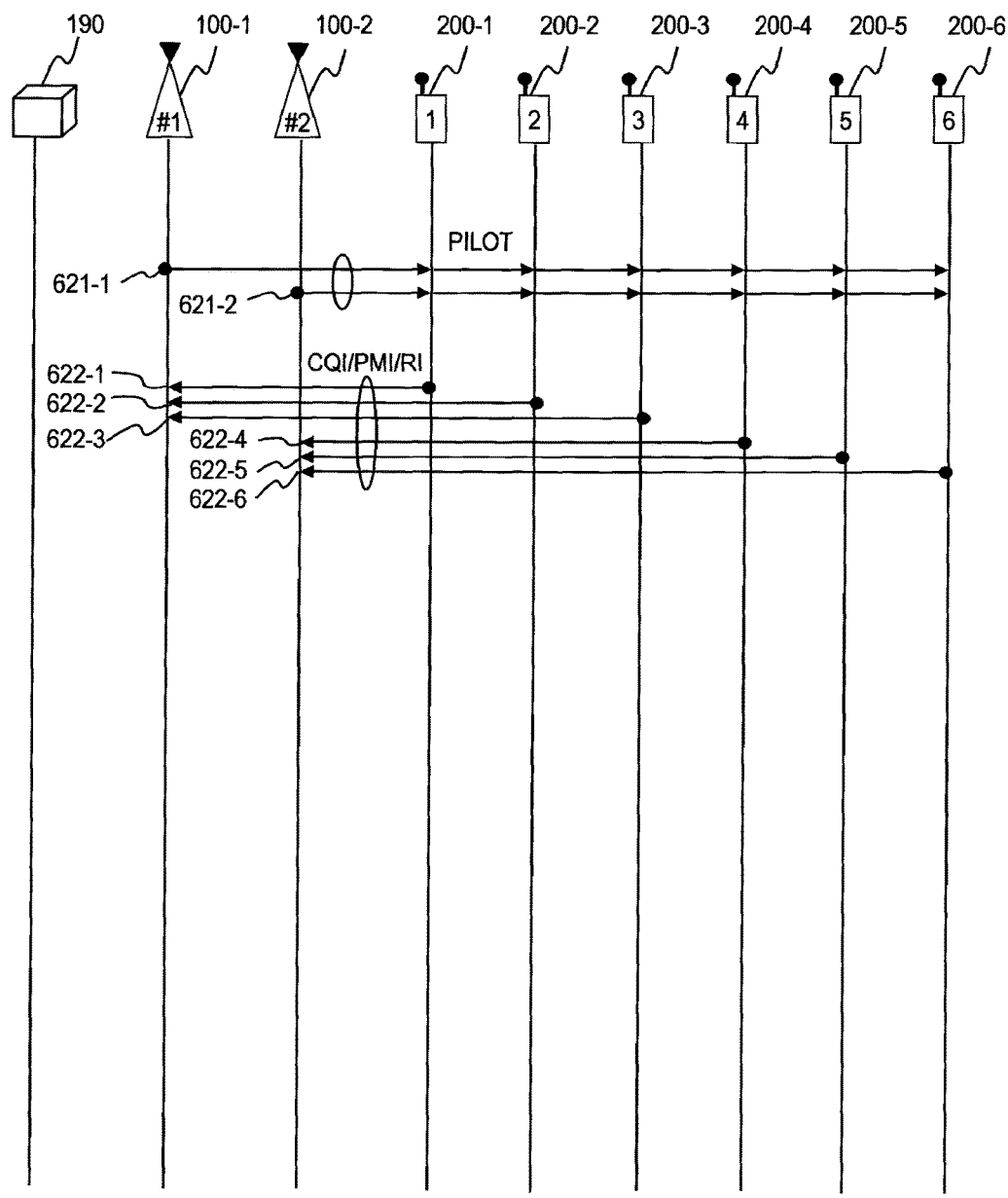
FIG. 13 is a sequence diagram illustrating processing form a reception of pilot signals by the wireless communication terminal from the base station, to a transmission of information necessary for single-base station transmission by the wireless communication terminal to the base station according to the first embodiment of this invention.

Described next with reference to FIGS. 1 and 13 is a sequence of data transmission through MU-MIMO transmission in which the base stations 100 cooperate with one another.

FIG. 13 is a sequence diagram illustrating processing form the reception of pilot signals by the wireless communication terminals 200-1 to 200-6 from the base stations 100-1 and 100-2 to the transmission of information necessary for single-base station transmission by the wireless communication terminals 200-1 to 200-6 to the base stations 100-1 and 100-2 according to the first embodiment of this invention. Each of the wireless communication terminals 200-1 to 200-6 belongs to one of the base stations 100-1 and 100-2, and transmits the necessary information to the base station 100-1 or 100-2 to which the each of the wireless communication terminals 200-1 to 200-6 belongs.

By the time this sequence starts, the wireless communication terminals 200-1 to 200-6 have obtained information necessary for data transmission to the base stations 100-1 and 100-2, such as synchronization information cell IDs of the base stations 100-1 and 100-2, through an analysis of synchronization signals.

The wireless communication terminals 200-1 to 200-3 belong to the base station 100-1, and the wireless communication terminals 200-4 to 200-6 belong to the base station 100-2.

The base stations 100-1 and 100-2 periodically transmit pilot signals to their respective wireless communication terminals 200-1 to 200-6 (621-1 and 621-2). The wireless communication terminals 200-1 to 200-6 monitor the received pilot signals and calculate channel matrices from the base stations 100-1 and 100-2.

When channel matrix calculation is performed in each of the wireless communication terminals 200-1 to 200-6, interference components from the base station to which the wireless communication terminal does not belong (for example, the base station 100-2 in the case of the wireless communication terminal 200-1) sometimes hinder the calculation. The interference components can be avoided by taking, for example, the following measures.

Examples of known avoidance measures include one in which other base stations 100 are kept from transmitting data with a resource that is used by one base station 100 to transmit a pilot signal, and one in which SINR is improved by executing diffusion processing for a pilot signal and then having the wireless communication terminal execute inverse diffusion. This invention is not limited to those measures and other avoidance measures may be employed.

Based on the calculated channel matrix, each of the wireless communication terminals 200-1 to 200-6 calculates CQI, PMI, and RI in single-base station transmission executed by the base station 100-1 or 100-2 to which the each of the wireless communication terminals 200-1 to 200-6 belongs, and feeds back the result of the calculation to the base station 100-1 or 100-2 to which the each of the wireless communication terminals 200-1 to 200-6 belongs via a control signal channel (622-1 to 622-6).

In the example of FIG. 13, the wireless communication terminals 200-1 to 200-3 feed back the calculation results to the base station 100-1, and the wireless communication terminals 200-4 to 200-6 feed back the calculation results to the base station 100-2.

FIG. 1 is a sequence diagram illustrating processing that is executed after the sequence of FIG. 13, from the reception of user data destined to the wireless communication terminals 200-1 to 200-6 by the base stations 100-1 and 100-2 from the gateway device 2, to the cooperative transmission through MU-MIMO transmission according to the first embodiment of this invention.

From the gateway device 2, the base station 100-1 receives user data destined to the wireless communication terminals 200-1, 200-2, and 200-3 (601-1), and the base station 100-2 receives user data destined to the wireless communication terminals 200-4, 200-5, and 200-6 (601-2). Receiving the user data, the in-station scheduler 105 of each of the base stations 100-1 and 100-2 executes scheduling for single-base station transmission.

At this point, the base stations 100-1 and 100-2 may exchange, via the cooperating base station IFs 107, information about Beam Forming (BF) beams such as a beam forming pattern (602) to be used for the scheduling.

The following description is given on the assumption that, as a result of the scheduling for single-base station transmission, the base station 100-1 has determined that wireless resource allocation for single-base station transmission is possible with respect to the wireless communication terminals 200-1 and 200-2, whereas the base station 100-2 has determined that wireless resource allocation for single-base station transmission is possible with respect to the wireless communication terminals 200-4 and 200-6.

In this case, the base station 100-1 transmits to the wireless communication terminals 200-1 and 200-2, through single-base station transmission, resource allocation signals and user data destined to the wireless communication terminals 200-1 and 200-2 (603-1 and 603-2).

Receiving the signals given above, the wireless communication terminals 200-1 and 200-2 transmit ACK signals indicating reception results to the base station 100-1 in response (604-1 and 604-2).

Similarly, the base station 100-2 transmits to the wireless communication terminals 200-4 and 200-6, through single-base station transmission, resource allocation signals for single-base station transmission and user data destined to the wireless communication terminals 200-4 and 200-6 (603-4 and 603-6).

Receiving the signals given above, the wireless communication terminals 200-4 and 200-6 transmit ACK signals indicating reception results to the base station 100-2 in response (604-4 and 604-6).

Meanwhile, the base station 100-1 transmits a cooperation information request signal to the wireless communication terminal 200-3 (605-3), and the base station 100-2 transmits a cooperation information request signal to the wireless communication terminal 200-5 (605-5). The cooperation information request signals to be transmitted have the packet format of FIG. 11A.

Receiving the cooperation information request signal from the base station 100-1, the wireless communication terminal 200-3 transmits a cooperation information notification signal to the base station 100-1 (606-3). Receiving the cooperation information request signal from the base station 100-2, the wireless communication terminal 200-5 transmits a cooperation information notification signal to the base station 100-2 (606-5). The cooperation information notification signals to be transmitted have the packet format of FIG. 12B.

The base station 100-1 receives the cooperation information notification signal from the wireless communication terminal 200-3 and the base station 100-2 receives the cooperation information notification signal from the wireless communication terminal 200-5. The base stations 100-1 and 100-2 then separately issue requests for cooperation scheduling to the cooperation scheduler 190 via the cooperation scheduler IFs 106 (607-1 and 607-2). The requests contain the received cooperation information notification signals.

Based on the received cooperation information notification signals, the cooperation scheduler 190 allocates wireless resources for cooperative transmission and, at the same time, refers to the result of the wireless resource allocation to determine a transmission method to be used in cooperative transmission.

In this embodiment, the cooperation scheduler 190 that has received the request for cooperation scheduling allocates wireless resources for cooperative transmission. The following description assumes that, as a result of the wireless resource allocation, the cooperation scheduler 190 determines that cooperative transmission through MU-MIMO transmission is to be performed for the wireless communication terminals 200-3 and 200-5.

The cooperation scheduler 190 notifies the determination result and information necessary for cooperative transmission, such as a precoding matrix, to the base stations 100-1 and 100-2 as a cooperation scheduling result (608-1 and 608-2).

Receiving the cooperation scheduling result, the base stations 100-1 and 100-2 exchange user data necessary for the cooperative transmission specified by the cooperation scheduling result via the cooperating base station IFs 107 (609).

Based on the precoding matrices that are specified in the cooperation scheduling results 608-1 and 608-2, the base station 100-1 and the base station 100-2 transmit resource allocation signals and user data to the wireless communication terminal 200-3 and the wireless communication terminal 200-5, respectively, through MU-MIMO transmission such as DPC (610-3 and 610-5).

The wireless communication terminals 200-3 and 200-5 execute user data reception processing in a manner instructed in the resource allocation signals upon receiving the resource allocation signal and the user data. Thereafter, the wireless communication terminal 200-3 transmits an ACK signal that indicates the result of the reception to the base station 100-1 in response (611-3), and the wireless communication terminal 200-5 transmits an ACK signal that indicates the result of the reception to the base station 100-2 in response (611-5).

According to the first embodiment of this invention, only the wireless communication terminals 200-3 and 200-5 which need cooperative transmission feed back cooperation information to the base stations 100-1 and 100-2, thereby implementing cooperative transmission.

Uplink wireless resources are thus used more efficiently than in the case where the wireless communication terminals 200-1 to 200-6 all feed back cooperation information, and can be saved for other uplink user data transmission sessions.

In addition, processing required for cooperation scheduling is reduced because the cooperation scheduler 190 needs to execute cooperation scheduling processing only for the wireless communication terminals 200-3 and 200-5.

Second Embodiment

A second embodiment of this invention is described below.

In the second embodiment of this invention, the network configuration and the configurations of the base stations 100 and the wireless communication terminals 200 are the same as in the first embodiment of this invention, and descriptions thereof are therefore omitted. The components of each base station 100 and each wireless communication terminal 200 in the second embodiment of this invention execute the same processing as in the first embodiment, and therefore a description thereof is also omitted.

The second embodiment is described below, with the focus on differences from the first embodiment.

Figure 14:
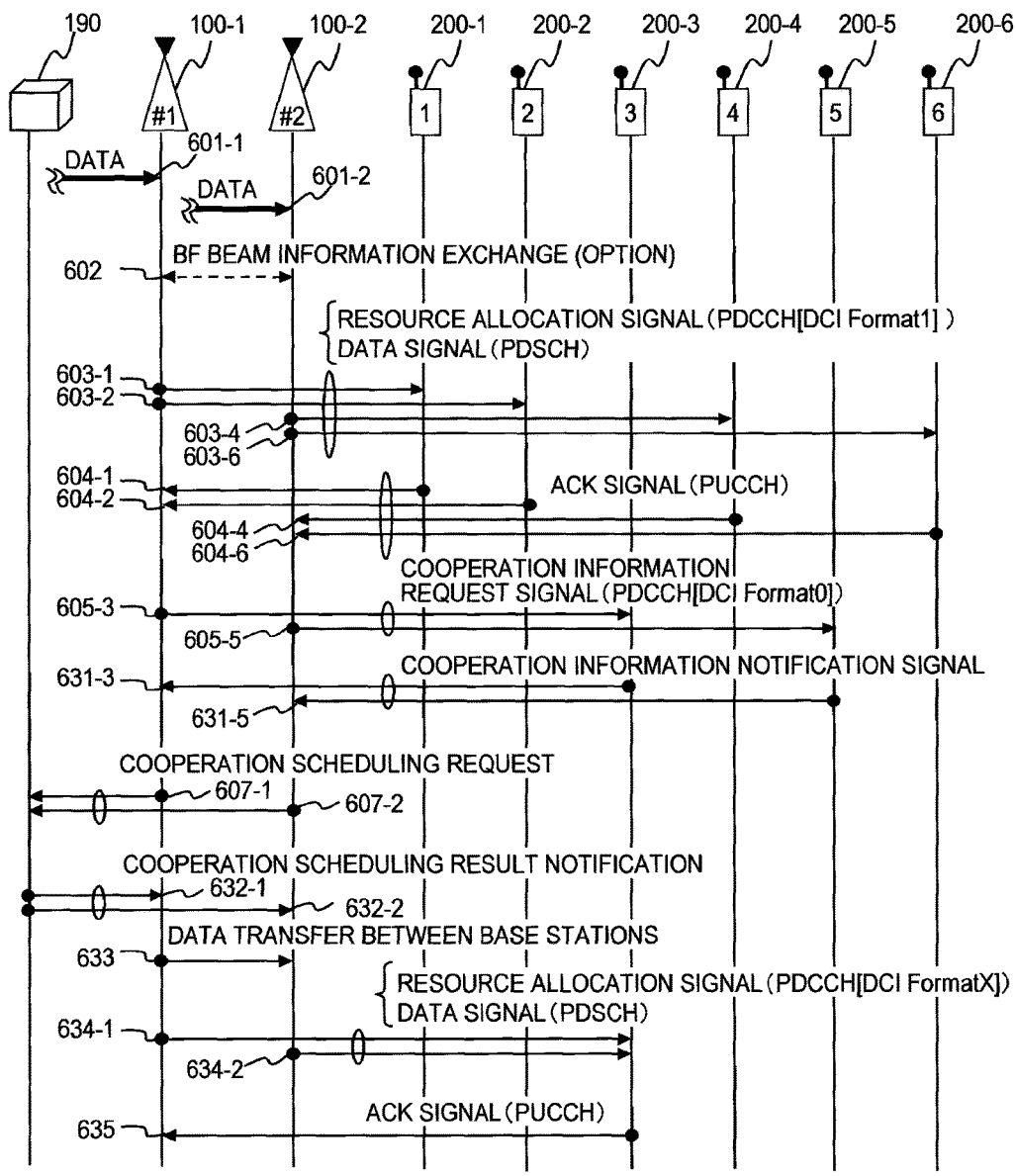
FIG. 14 is a sequence diagram illustrating processing form the reception of user data destined to the wireless communication terminal by the base station from the gateway device, to cooperative transmission through SU transmission according to the second embodiment of this invention.

FIG. 14 is a sequence diagram illustrating processing form the reception of user data destined to the wireless communication terminals 200-1 to 200-6 by the base stations 100-1 and 100-2 from the gateway device 2, to cooperative transmission through SU transmission according to the second embodiment of this invention.

In the second embodiment, which channels are used to transmit respective signals in communication between the base stations 100 and the wireless communication terminals 200 that conforms to 3GPP LTE is also described.

The following description is given on the assumption that, prior to this sequence, the wireless communication terminals 200-1 to 200-6 have received pilot signals and information for single-base station transmission have been fed back to the base stations 100-1 and 100-2, following the sequence of FIG. 13.

The step in which the base stations 100-1 and 100-2 receive user data (601-1 and 601-2), the step in which the base stations 100-1 and 100-2 exchange BF beam information (602), and the step in which the base station 100-1 determines that wireless resource allocation for single-base station transmission is possible with respect to the wireless communication terminals 200-1 and 200-2, the base station 100-2 determines that wireless resource allocation for single-base station transmission is possible with respect to the wireless communication terminals 200-4 and 200-6, and the base stations 100-1 and 100-2 transmit resource allocation signals and user data to these wireless communication terminals 200 (603-1, 603-2, 603-4, and 603-6) are the same as those in the first embodiment.

However, Downlink Control Information (DCI) on Physical Downlink Control Channel (PDCCH) of LTE is used as the resource allocation signals. A DCI format appropriate for the employed transmission method is selected.

The user data signals are transmitted on Physical Downlink Shared Channel (PDSCH).

The transmission of the ACK signals which are transmitted in response to the resource allocation signals and the user data signals (604-1, 604-2, 604-4, and 604-6) uses Physical Uplink Control Channel (PUCCH).

An expansion of DCI (format 0) on PDCCH to the packet format of FIG. 11A is used for the cooperation information request signals (605-3 and 605-5).

The wireless communication terminal 200-3 receives the cooperation information request signal (605-3) and transmits a cooperation information notification signal to the base station 101-1 (631-3). The wireless communication terminal 200-5 receives the cooperation information request signal (605-5) and transmits a cooperation information notification signal to the base station 100-2 (631-5).

The cooperation information notification signals (631-3 and 631-5) have the packet format of FIG. 12A, and are transmitted on Physical Uplink Shared Channel (PUSCH).

Receiving the cooperation information notification signals (631-3 and 631-5), the base station 100-1 and the base station 100-2 separately issue requests for cooperation scheduling to the cooperation scheduler 190 via the cooperation scheduler IFs 106 (607-1 and 607-2). The requests for cooperation scheduling contain the received cooperation information notification signals.

Receiving the cooperation scheduling requests, the cooperation scheduler 190 allocates wireless resources for cooperative transmission.

The assumption of this embodiment is that, as a result of the wireless resource allocation, the cooperation scheduler 190 has decided to execute cooperative transmission through SU transmission for the wireless communication terminal 200-3, and to hold off wireless resource allocation to the wireless communication terminal 200-5 until the next transmission timing.

The cooperation scheduler 190 notifies information necessary for cooperative transmission, including this decision, to the base stations 100-1 and 100-2 as a cooperation scheduling result (632-1 and 632-2).

The base station 100-1 transfers to the base station 100-2, via the cooperating base station IF 107, user data necessary to carry out the specified cooperative transmission upon receiving the cooperation scheduling result (633).

The base stations 100-1 and 100-2 transmit a resource allocation signal, and transmit user data through SU transmission such as Open-Loop MIMO, to the wireless connection terminal 200-3 (634-1 and 634-2).

It should be noted that, for the resource allocation signal, DCI on PDCCH is used. A DCI format appropriate for the employed transmission method is selected. The user data signal is transmitted on PDSCH.

Receiving the resource allocation signal and the user data, the wireless communication terminal 200-3 performs user data reception processing in a manner instructed in the resource allocation signal.

The wireless communication terminal 200-3 transmits an ACK signal that indicates the result of the reception to the base station 100-1 in response (635).

According to the second embodiment of this invention, only the wireless communication terminal 200-3 which needs cooperative transmission feeds back cooperation information, and uplink wireless resources are thus saved as in the first embodiment. This also reduces the processing executed by the cooperation scheduler 190 for cooperation scheduling.

In addition, in the second embodiment of this invention where the wireless communication terminal 200-3 alone uses two base stations 100-1 and 100-2, the throughput in cooperative transmission is improved even more.

Third Embodiment

A third embodiment of this invention is described below.

In the third embodiment of this invention, the network configuration and the configurations of the base stations 100 and the wireless communication terminals 200 are the same as in the first embodiment of this invention, and descriptions thereof are therefore omitted. The components of each base station 100 and each wireless communication terminal 200 in the third embodiment of this invention execute the same processing as in the first embodiment, and therefore a description thereof is also omitted.

The third embodiment is described below, with the focus on differences from the first embodiment.

Figure 15:
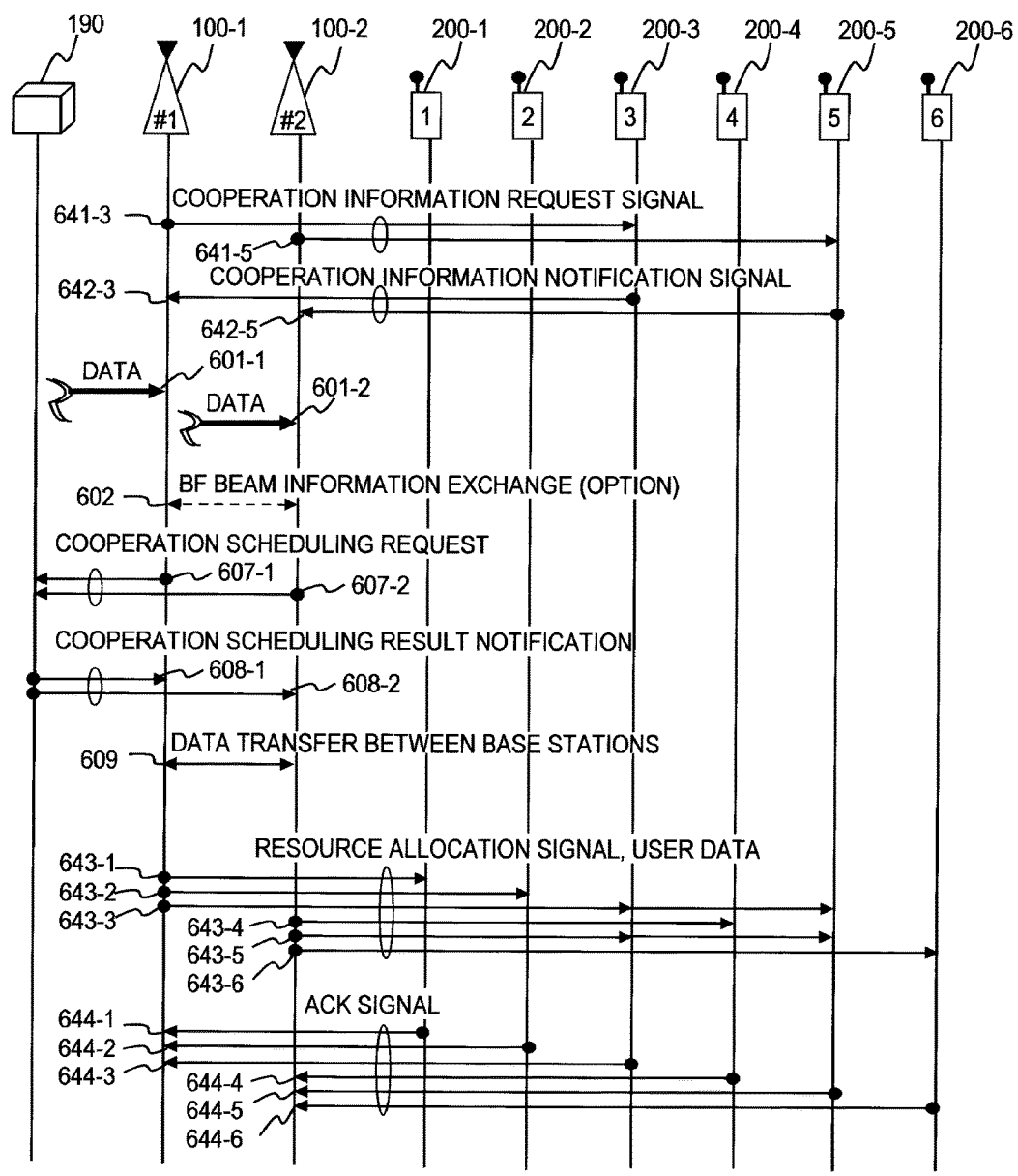
FIG. 15 is a sequence diagram illustrating processing that is executed in the case where the base station request information necessary for cooperative transmission before user data arrives at the wireless communication terminal according to the third embodiment of this invention.

FIG. 15 is a sequence diagram illustrating processing that is executed in the case where the base stations 100-1 and 100-2 request information necessary for cooperative transmission before user data arrives at the wireless communication terminals 200 according to the third embodiment of this invention.

The following description is given on the assumption that, prior to this sequence, the wireless communication terminals 200-1 to 200-6 have received pilot signals and information for single-base station transmission have been fed back to the base stations 100-1 and 100-2, following the sequence of FIG. 13.

The assumption of this embodiment is that the base station 100-1 has determined, from CQI information for single-base station transmission or from traffic at the wireless communication terminals 200-1 to 200-6, that cooperative transmission is to be used for the wireless communication terminal 200-3, while the base station 100-2 has similarly determined that cooperative transmission is to be used for the wireless communication terminal 200-5.

In this case, the base station 100-1 transmits a cooperation information request signal to the wireless communication terminal 200-3 (641-3). Receiving the cooperation information request signal, the wireless communication terminal 200-3 transmits a cooperation information notification signal to the base station 100-1 in response (642-3).

In the same manner, the base station 100-2 transmits a cooperation information request signal to the wireless communication terminal 200-5 (641-5). Receiving the cooperation information request signal, the wireless communication terminal 200-5 transmits a cooperation information notification signal to the base station 100-2 in response (642-5).

In the case where the base stations 100-1 and 100-2 subsequently receive user data from the gateway device 2 (601-1 and 602-2), the base stations 100-1 and 100-2 exchange BF beam information with each other (602), and transmit cooperation scheduling requests (607-1 and 607-2) to the cooperation scheduler 190.

Receiving the cooperation scheduling requests, the cooperation scheduler 190 notifies cooperation scheduling results to the base stations 100-1 and 100-2 (608-1 and 608-2).

Receiving the cooperation scheduling results, the base stations 100-1 and 100-2 exchange information necessary for cooperation with each other (609), and transmit resource allocation signals and user data to the wireless communication terminals 200-1 to 200-6, respectively (643-1 to 643-6). Single-base station transmission is used for the wireless communication terminals 200-1, 200-2, 200-4, and 200-6, and cooperative transmission is used for the wireless communication terminals 200-3 and 200-5.

Through the processing described above, data transmission to the wireless communication terminals 200-3 and 200-5, which need cooperative transmission, can be synchronized with data transmission to the other wireless communication terminals 200-1, 200-2, 200-4, and 200-6.

This allows the wireless communication terminals 200-1 to 200-6 to transmit ACK signals at the same time in response to received user data (644-1 to 644-6).

Wireless resource allocation in this embodiment is described below.

Figure 18:
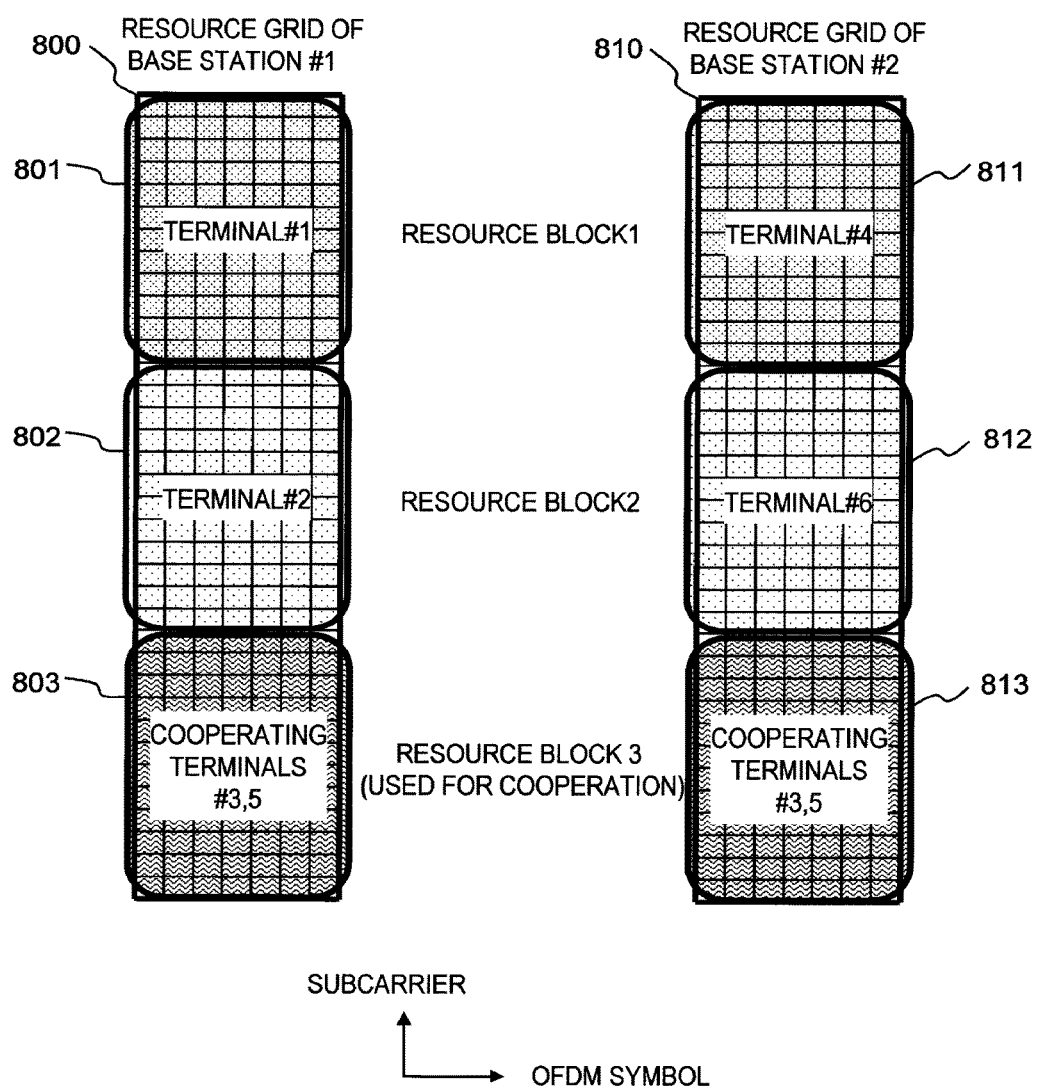
FIG. 18 is a diagram for explaining a resource grid upon cooperative transmission according to the third embodiment of this invention.

FIG. 18 is a diagram for explaining a resource grid upon cooperative transmission according to the third embodiment of this invention.

The resource grid is a pattern obtained by sectioning wireless resources that are allocated for one transmission timing by OFDMA symbol and subcarrier.

In the example of FIG. 18, a horizontal grid line separates one subcarrier from another and a vertical grid line separates one OFDM symbol from another.

Resource girds 800 and 810 illustrated in FIG. 18 represent the resource grids of the base stations 100-1 and 100-2, respectively.

The resource grid 800 has a block 801, a block 802, and a block 803, which corresponds to a resource block 1, a resource block 2, and a resource block 3, respectively. The resource grid 810 has a block 811, a block 812, and a block 813, which correspond to the resource block 1, the resource block 2, and the resource block 3, respectively.

In the sequence of FIG. 15, for example, the wireless communication terminals 200-1 and 200-2 are allocated the resource blocks 801 and 802, respectively, and the wireless communication terminals 200-4 and 200-6 are allocated the resource blocks 811 and 812, respectively.

The resource blocks 803 and 813 are allocated for cooperative transmission that is executed for the wireless communication terminals 200-3 and 200-5 through MU-MIMO transmission.

The resource blocks 801 to 803 and 811 to 813 are transmitted at the same time in the sequence of FIG. 15.

According to the third embodiment of this invention, a delay in transmitting user data necessary for cooperative transmission is eliminated. Specifically, because the base stations 100-1 and 100-2 have already obtained cooperation information by the time the base stations 100-1 and 100-2 receive user data from the gateway device 2, the user data can be transmitted immediately through cooperative transmission without spending time on requesting cooperation information and waiting for a cooperation information notification.

Fourth Embodiment

A fourth embodiment of this invention is described below.

In the fourth embodiment of this invention, the network configuration and the configurations of the base stations 100 and the wireless communication terminals 200 are the same as in the first embodiment of this invention, and descriptions thereof are therefore omitted. The components of each base station 100 and each wireless communication terminal 200 in the fourth embodiment of this invention execute the same processing as in the first embodiment, and therefore a description thereof is also omitted.

Figure 16:
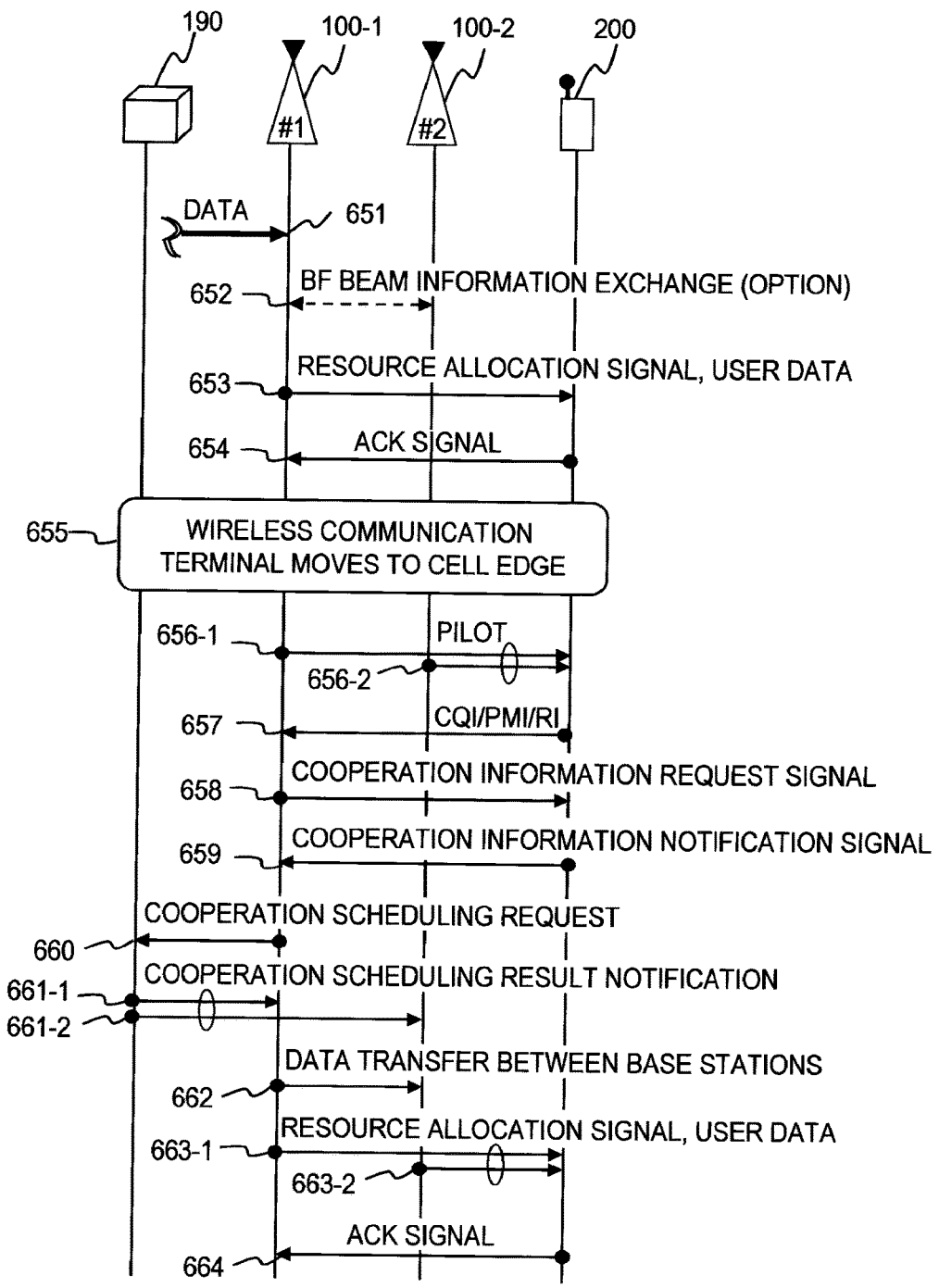
FIG. 16 is a sequence diagram illustrating processing that is executed when the wireless communication terminal that has been at the cell center at first and has used single-base station transmission moves to the cell edge and comes to need cooperative transmission according to the fourth embodiment of this invention.

FIG. 16 is a sequence diagram illustrating processing that is executed when the wireless communication terminal 200 that has been at the cell center at first and has used single-base station transmission moves to the cell edge and comes to need cooperative transmission according to the fourth embodiment of this invention.

The base station 100-1 receives from the gateway device 2 user data destined to the wireless communication terminal 200 (651), exchanges BF beam information with the base station 100-2 if necessary (652), and allocates wireless resources for single-base station transmission.

In the case where the wireless resources for single-base station transmission are allocated as a result of the wireless resource allocation, the base station 100-1 transmits a resource allocation signal and user data to the wireless communication terminal 200 (653).

Receiving the resource allocation signal and the user data, the wireless communication terminal 200 performs reception processing and transmits an ACK signal to the base station 100-1 (654).

The wireless communication terminal 200 then moves to the cell edge (655).

The wireless communication terminal 200 calculates CQI and others based on pilot signals (656-1 and 656-2) that are periodically transmitted from the base stations 100-1 and 100-2, and periodically feeds back the calculated CQI and other values to the base station 100-1 as information necessary for single-base station transmission (657).

Receiving from the wireless communication terminal 200 the information necessary for single-base station transmission, the base station 100-1 determines that sufficient wireless resources cannot be allocated through data transmission from a single base station, and transmits a cooperation information request signal to the wireless communication terminal 200 (658).

Receiving the cooperation information request signal, the wireless communication terminal 200 transmits a cooperation information notification signal to the base station 100-1 in response (659).

Receiving the cooperation information notification signal, the base station 100-1 issues a request for cooperation scheduling to the cooperation scheduler 190 (660). The request for cooperation scheduling contains the received cooperation information notification signal.

Receiving the request for cooperation scheduling, the cooperation scheduler 190 allocates wireless resources to the wireless communication terminal 200 for cooperative transmission through SU transmission, and notifies the result of the wireless resource allocation to the base stations 100-1 and 100-2 as a cooperation scheduling result (661-1 and 661-2).

The base station 100-1 receives the cooperation scheduling result and transfers user data necessary for the cooperative transmission to the base station 100-2 (662).

The base station 100-1 and 100-2 transmit resource allocation signals, and transmit user data by cooperative transmission through SU transmission, to the wireless communication terminal 200 (663-1 and 663-2).

Receiving the resource allocation signals and the user data, the wireless communication terminal 200 performs reception processing and transmits an ACK signal to the base station 100-1 in response (664).

According to the fourth embodiment of this invention, the wireless communication terminal 200 needs to transmit cooperation information only when the wireless communication terminal 200 moves to a place that necessitates cooperative transmission, and uplink wireless resources can therefore be saved.

Fifth Embodiment

A fifth embodiment of this invention is described below.

In the fifth embodiment of this invention, the network configuration and the configurations of the base stations 100 and the wireless communication terminals 200 are the same as in the first embodiment of this invention, and descriptions thereof are therefore omitted. The components of each base station 100 and each wireless communication terminal 200 in the fifth embodiment of this invention execute the same processing as in the first embodiment, and therefore a description thereof is also omitted.

Figure 17:
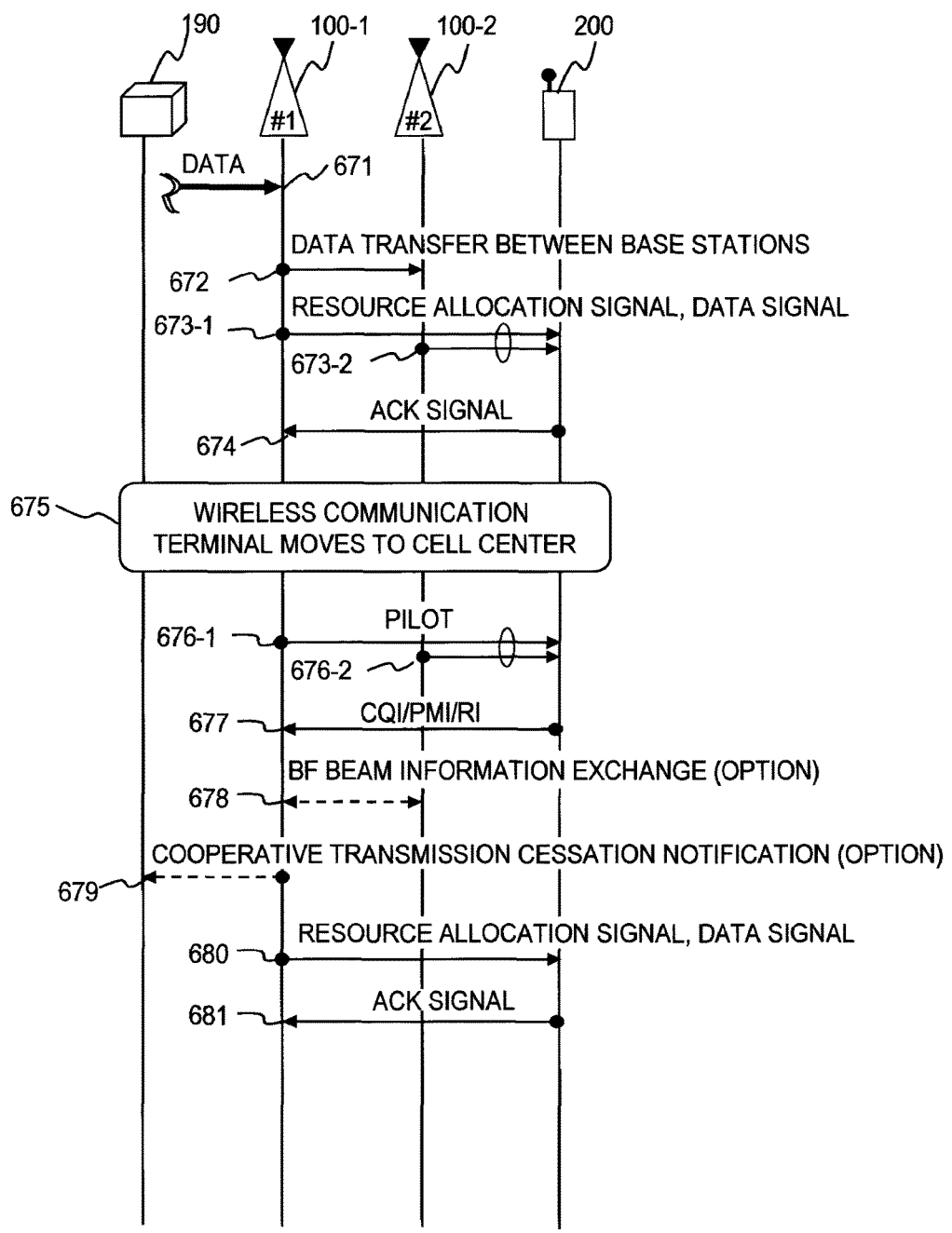
FIG. 17 is a sequence diagram illustrating processing according to the fifth embodiment of this invention that is executed in the case where the wireless communication terminal that has at the cell edge at first and has used data transmission by cooperating transmission moves to the cell center and switches to single-base station transmission.

FIG. 17 is a sequence diagram illustrating processing that is executed when the wireless communication terminal 200 that has at the cell edge at first and has used data transmission by cooperating transmission moves to the cell center and switches to single-base station transmission according to the fifth embodiment of this invention.

The base station 100-1 receives from the gateway device 2 user data destined to the wireless connection terminal 200 (671), and transfers the user data to the base station 100-2 in order to execute cooperative transmission (672).

The base station 100-1 and 100-2 transmit resource allocation signals, and transmit user data by cooperative transmission through SU transmission, to the wireless communication terminal 200 (673-1 and 673-2).

Receiving the resource allocation signals and the user data, the wireless communication terminal 200 performs reception processing and transmits an ACK signal to the base station 100-1 in response (674).

The wireless communication terminal 200 then moves to the cell center (675).

The wireless communication terminal 200 calculates CQI and others based on pilot signals (676-1 and 676-2) that are periodically transmitted from the base stations 100-1 and 100-2, and periodically feeds back the calculated CQI and other values as information necessary for single-base station transmission (677).

The base station 100-1 receives the information from the wireless communication terminal 200 and, if necessary, exchanges BF beam information with the base station 100-2 (678).

The assumption of this embodiment is that the base station 100-1 determines that sufficient wireless resources can be allocated through data transmission from a single base station.

The base station 100-1 in this case notifies, if necessary, the cooperation scheduler 190 of the cessation of cooperative transmission to the wireless communication terminal 200 (679).

The base station 100-1 transmits resource allocation signals, and transmits user data by single-base station transmission, to the wireless communication terminal 200 (680).

Receiving the resource allocation signals and the user data, the wireless communication terminal 200 performs reception processing and transmits an ACK signal to the base station 100-1 in response (681).

According to the fifth embodiment of this invention, the wireless communication terminal ceases to transmit cooperation information when the wireless communication terminal 200 moves to a place that does not necessitate cooperative transmission, and uplink wireless resources can therefore be saved.

Sixth Embodiment

A sixth embodiment of this invention is described below.

The sixth embodiment describes a method of reducing the amount of cooperation information that is transmitted from the wireless communication terminals 200 in the first to fifth embodiments described above by using a preselected subband fixedly to feed back cooperation information.

Figures 19A, 19B:
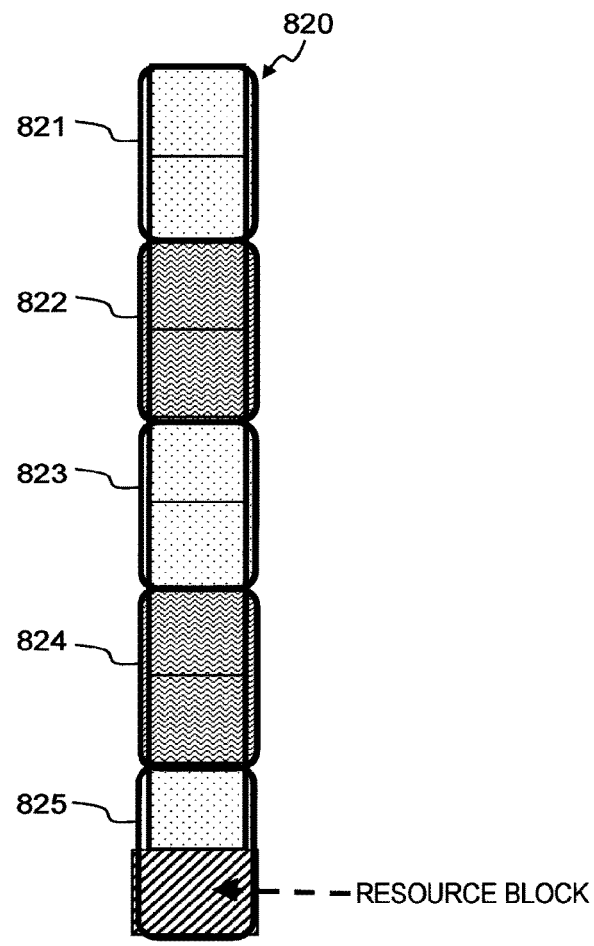
FIG. 19A is a diagram illustrating subbands according to the sixth embodiment of this invention.
FIG. 19B is a diagram illustrating an association relation between a number of the resource block and a number of the subband according to the sixth embodiment of this invention.

FIG. 19A is a diagram illustrating subbands according to the sixth embodiment of this invention.

As illustrated in FIG. 19A, subbands are constituted of consecutive resource blocks.

A resource grid 820 in the example of FIG. 19A is divided into five subbands 821 to 825, each of which is constituted of two consecutive resource blocks.

FIG. 19B is a diagram illustrating an association relation between a number of the resource block and a number of the subband according to the sixth embodiment of this invention.

The number of resource blocks per subband can be changed by changing the total number of resource blocks.

As illustrated in FIG. 19B, a table representing the association relation between the number of the resource block and the number of the subband includes in each entry a number of a total resource block 561, a subband size 562, and a number of a subband 563.

The number of the total resource block 561 includes the total number of resource blocks. The subband size 562 includes the number of resource blocks per subband. The number of the subband 563 includes the total number of subbands. The example of FIG. 19A corresponds to an entry 564 of FIG. 19B.

In the examples of FIGS. 12A and 12B, a cooperation information notification signal fed back by the wireless communication terminals 200 needs to contain as many pieces of cooperation information as the number of subbands. Using a preselected subband fixedly for cooperative transmission in the wireless communication system reduces the amount of cooperation information contained in the cooperation information notification signal and accordingly saves uplink wireless resources.

For example, in the case where two subbands, the subband 824 and the subband 825, are used fixedly for cooperative transmission in FIG. 19A, necessary cooperation information is ⅖ of the amount required when a different subband is used each time.

Instead of using a preselected subband fixedly for cooperative transmission, the cooperation scheduler 190 may dynamically determine a subband optimum for cooperative transmission. The determined subband is contained in the cooperation subband field 509 within the cooperation information request signal as illustrated in FIG. 11A, thereby allowing the base station 100 to give the destination wireless communication terminal 200 an instruction about which subband to use.

According the sixth embodiment of this invention, uplink wireless resources for feeding back cooperation information can be saved and, if the option of dynamically selecting a subband is chosen, a subband optimum for cooperative transmission can be selected.

Seventh Embodiment

A seventh embodiment is described below.

The seventh embodiment describes a method of using NACK for a switch between data transmission through single-base station transmission and data transmission through cooperative transmission.

In the embodiments described above, whether or not to perform cooperative transmission is determined based on the success/failure of downlink wireless resource allocation or on CQI, PMI, and RI. However, other standards such as the following ones may be used for the determination:

Each base station 100 decides to use cooperative transmission for the wireless communication terminal 200 that has used single-base station transmission if an NACK signal indicating a reception failure is received from the wireless communication terminal 200 a reference number of times, which is determined in advance, or more. In other words, whether or not to perform cooperative transmission is determined based on information about the success/failure of data reception which is transmitted from the wireless communication terminal 200.

According to the seventh embodiment, the base stations 100 can salvage data that has failed to be received by determining whether or not to use cooperative transmission based on the actual success/failure of data reception.

Eighth Embodiment

An eighth embodiment is described below.

The eighth embodiment describes a method in which each base station 100 transmits all cooperation information request signals at once. In the first to seventh embodiments, the base station 100 separately transmits a cooperation information request signal destined to one wireless communication terminal 200 and a cooperation information request signal destined to another wireless communication terminal 200. In this embodiment, on the other hand, the base station 100 transmits cooperation information request signals through one-to-many transmission such as broadcast transmission or multicast transmission. For example, in the case where the number of wireless communication terminals 200 that cannot be allocated wireless resources through single-base station transmission exceeds a certain threshold, the base station 100 transmits cooperation information request signals to these wireless communication terminals 200 at once. The wireless communication terminals 200 receive the cooperation information request signals transmitted at once and transmit cooperation information notification signals to the base station 100.

According to the eighth embodiment, there is obtained an effect of being able to save downlink wireless resources necessary for cooperation information request signals when the number of wireless communication terminals 200 that need cooperative transmission is large.

Lastly, effects of this invention are described taking as an example an association relation between the ratio of the wireless communication terminals 200 that use cooperative transmission to all wireless communication terminals 200 (hereinafter, referred to as cooperating wireless communication terminal ratio) and the amount of feedback transmitted by a single wireless communication terminal 200 when the first embodiment or second embodiment of this invention is applied. The same effects are obtained from the third to eighth embodiment of this invention.

Figure 20:
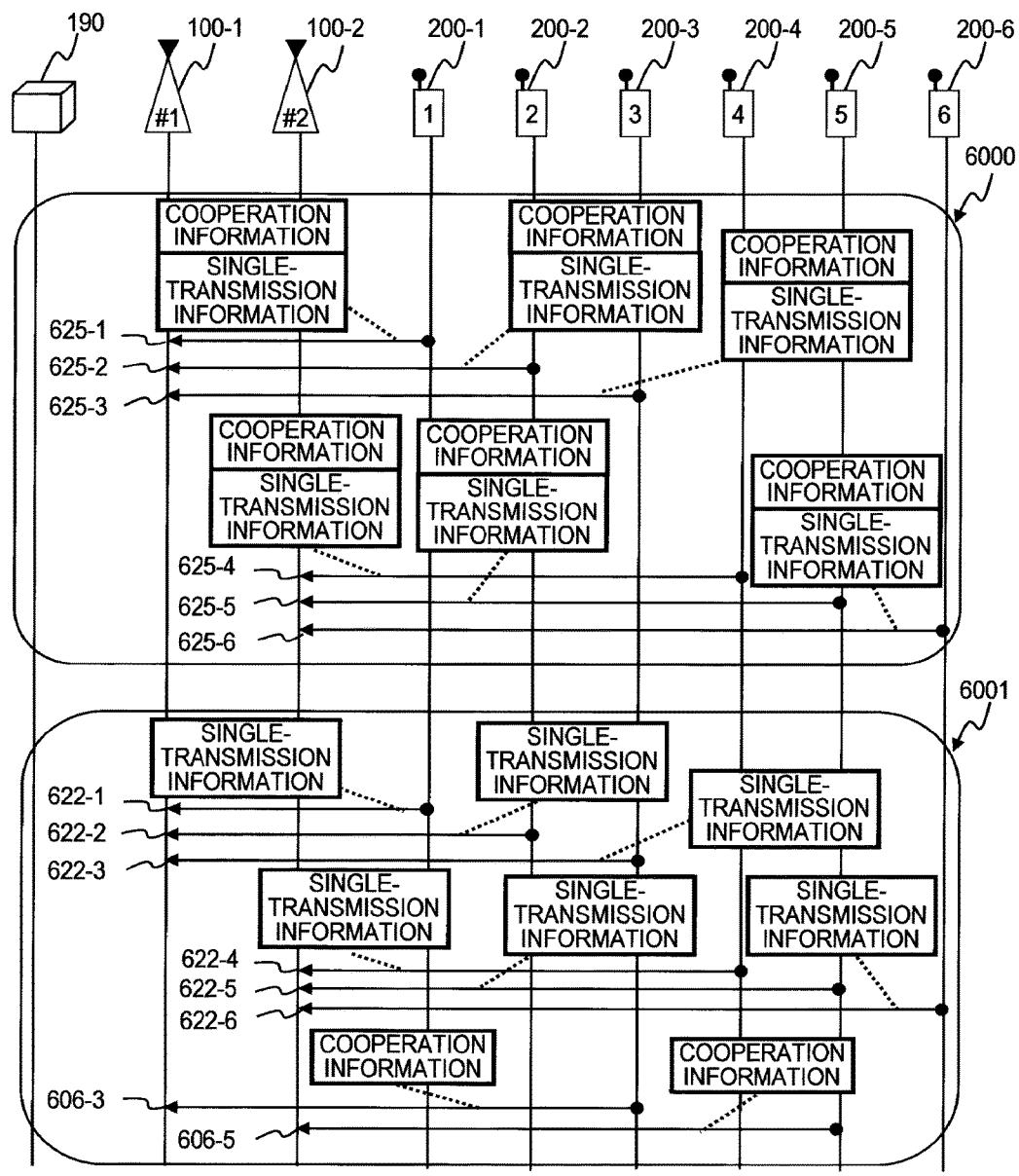
FIG. 20 is a diagram illustrating effects according to the first embodiment or the second embodiment of this invention.

FIG. 20 is a diagram illustrating effects that are obtained when the first embodiment or second embodiment of this invention is applied.

A frame 6000 illustrates information that is fed back from the wireless communication terminals 200 to the base stations 100 when conventional cooperative transmission is executed. Conventionally, as illustrated in the frame 6000, all wireless communication terminals 200-1 to 200-6 periodically feed back information for single-base station transmission and cooperation information to the base stations 100-1 and 100-2 (625-1 to 625-6).

A frame 6001 illustrates information that is fed back from the wireless communication terminals 200 to the base stations 100 when the first embodiment or second embodiment of this invention is applied.

According to this invention, only the wireless communication terminals 200-3 and 200-5 which need cooperative transmission feed back cooperation information to the base stations 100-1 and 100-2 in response to requests from the base stations 100-1 and 100-2 (606-3 and 606-5). The only information the wireless communication terminals 200-1 to 200-6 need to feed back periodically to the base stations 100-1 and 100-2 is information for single-base station transmission (622-1 to 622-6). The amount of feedback is reduced as a result.

Figure 21A:
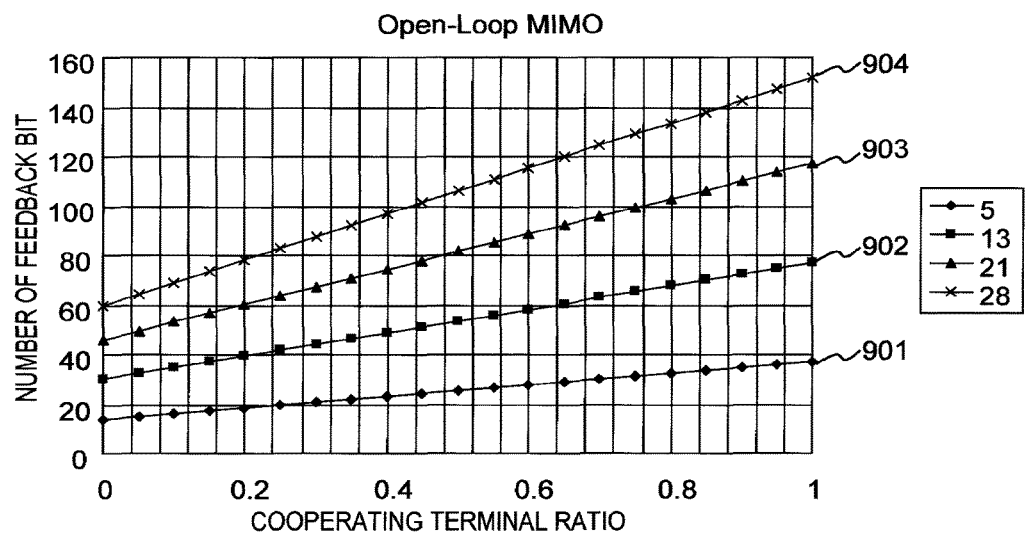
FIG. 21A is a graph illustrating changes in the number of bits in an uplink wireless resource band that is used by one wireless communication terminal for one feedback transmission session in the case where the cooperating wireless communication terminal ratio is changed based on the packet format of the cooperation information notification signal of FIG. 12A.

FIG. 21A is a graph illustrating changes in the number of bits in an uplink wireless resource band that is used by one wireless communication terminal 200 for one feedback transmission session in the case where the cooperating wireless communication terminal ratio is changed based on the packet format of the cooperation information notification signal of FIG. 12A.

It should be noted that, in the following description, the cooperation method field 531 and the cooperating base station set field 532 together take up four bits in the packet format of the cooperation information notification signal. The cooperation wideband CQI field 533 uses four bits. The cooperation subband CQI field 534-1 and the cooperation subband RI field 534-2 combined use three bits.

Graphs 901, 902, 903, and 904 of FIG. 21A respectively represent results observed when the number of the subband is 5, 13, 21, and 28.

Values at a cooperating wireless communication terminal ratio of "1.0" represent results of the conventional case. It is understood from FIG. 21A that applying this invention decreases the number of the feedback bit.

Figure 21B:
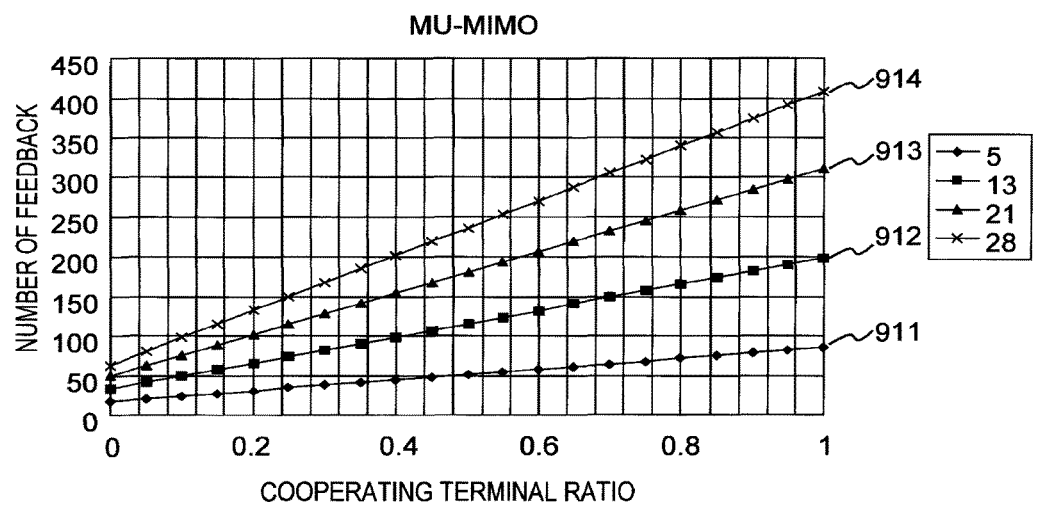
FIG. 21B is a graph illustrating changes in the number of bits in an uplink wireless resource band that is used by one wireless communication terminal for one feedback transmission session in the case where the cooperating wireless communication terminal ratio is changed based on the packet format of the cooperation information notification signal of FIG. 12B.

FIG. 21B is a graph illustrating changes in the number of bits in an uplink wireless resource band that is used by one wireless communication terminal 200 for one feedback transmission session in the case where the cooperating wireless communication terminal ratio is changed based on the packet format of the cooperation information notification signal of FIG. 12B.

It should be noted that, in the following description, the cooperation method field 541 and the cooperating base station set field 542 together take up four bits in the packet format of the cooperation information notification signal. The cooperation wideband CQI field 543 uses four bits. The channel matrix field 544-1 uses twelve (6×2) bits.

Graphs 911, 912, 913, and 914 of FIG. 21B respectively represent results observed when the number of the subband is 5, 13, 21, and 28.

Values at a cooperating wireless communication terminal ratio of "1.0" represent results of the conventional case. It is understood from FIG. 21B that applying this invention decreases the number of the feedback bit.

What is claimed is:

1. A wireless communication system comprising a plurality of base stations that transmit data to a plurality of communication terminals with cooperation among the plurality of base stations, wherein:
    each of the plurality of communication terminals is configured to:
        communicate with the plurality of base stations; and
        periodically transmit, to one of the plurality of base stations, information necessary for data transmission from a single base station out of the plurality of base stations,
    each of the plurality of base stations is configured to:
        determine whether only a selected communication terminal among the plurality of communication terminals can secure a communication quality which should be satisfied by using the data transmission from the single base station in the case of determining whether the communication terminal needs the data transmission through the cooperation among the plurality of base stations;
        transmit a transmission instruction of the cooperation information to the only selected communication terminal in the case where a determination is made that the only selected communication terminal cannot secure the communication quality;
        allocate wireless resources for the data transmission from the single base station to the selected communication terminal, based on the received information necessary for the data transmission from the single base station in the case where a determination is made that the only selected communication terminal can secure the communication quality; and
        refer to a result of the wireless resource allocation to the selected communication terminal for the data transmission from the single base station, and determine that cooperative transmission is necessary when the wireless resource allocation for the data transmission from the single base station to the selected communication terminal is determined as a failure, the selected communication terminal not being allocated the wireless resources for the data transmission when the wireless resource allocation for the data transmission from the single base station to the selected communication terminal is determined as the failure;
    the cooperation information is information that is necessary for the data transmission through the cooperation among the plurality of base stations, and
    the only selected communication terminal is configured to transmit cooperation information to the plurality of base stations in a case of receiving the transmission instruction of cooperation information.

2. The wireless communication system according to claim 1, further comprising a cooperation scheduler, which is configured to:
    allocate the wireless resources to the only selected communication terminal for the data transmission through the cooperation among the plurality of base stations, based on the cooperation information received by the plurality of base stations; and
    transmit a result of the wireless resource allocation for the data transmission through the cooperation among the plurality of base stations to the plurality of cooperating base stations.

3. The wireless communication system according to claim 2, wherein,
    the only selected communication terminal transmits the cooperation information to the plurality of base stations which includes information necessary to execute data transmission to the only selected communication terminal through the cooperation among the plurality of base stations, and information necessary to execute data transmission to a plurality of the only selected communication terminals through the cooperation among the plurality of base stations, and
    the each of the plurality of base stations is configured to determine whether the data transmission to the only selected communication terminal through the cooperation among the plurality of base stations or the data transmission to the plurality of the only selected communication terminals through the cooperation among the plurality of base stations is to be executed based on the received cooperation information.

4. The wireless communication system according to claim 2, wherein,
    the wireless resources are divided into a plurality of subchannels,
    the cooperation scheduler is configured to allocate a predetermined specific subchannel to the only selected communication terminal as the wireless resources for the data transmission through the cooperation among the plurality of base stations, and
    the base station is configured to set information about the predetermined specific subchannel in the transmission instruction of cooperation information.

5. The wireless communication system according to claim 2, wherein,
the wireless resources are divided into a plurality of subchannels,
the cooperation scheduler is configured to determine at least one of the plurality of subchannels which is to be allocated as the wireless resources for the data transmission through the cooperation among the plurality of base stations, and
the base station is configured to transmit the transmission instruction of cooperation information which includes information about the determined subchannel.

6. The wireless communication system according to claim 1, wherein
the each of the plurality of base stations is configured to:
refer to a result of the wireless resource allocation to the only selected communication terminal for the data transmission from the single base station; and
determine whether the data transmission from the single base station is executable for the only selected communication terminal.

7. The wireless communication system according to claim 1, wherein
the each of the plurality of base stations is configured to:
refer to the information necessary for the data transmission from the single base station which is transmitted from the only selected communication terminal; and
determine whether the data transmission from the single base station is executable for the only selected communication terminal.

8. The wireless communication system according to claim 1, wherein
the each of the plurality of base stations is configured to:
refer to traffic information of the only selected communication terminal; and
determine whether the data transmission from the single base station is executable for the only selected communication terminal.

9. The wireless communication system according to claim 1, wherein
the each of the plurality of base stations is configured to:
refer to ACK information and NACK information which are transmitted from the only selected communication terminal; and
determine whether the data transmission from the single base station is executable for the only selected communication terminal.

10. The wireless communication system according to claim 1, wherein the cooperation information includes at least one of a channel quality, a number of MTMO ranks, a precoding matrix desired by the only selected communication terminal, and a channel matrix in the data transmission through the cooperation among the plurality of base stations.

11. A base station included in a wireless communication system, wherein:
the base station transmits data to a plurality of communication terminals through cooperation among a plurality of other base stations,
each of the plurality of communication terminals is configured to:
communicate with the base station; and
periodically transmit, to the base station, information necessary for data transmission from a single base station out of the plurality of other base stations,
the base station is configured to:
determine whether only a selected communication terminal among the plurality of communication terminals can secure a communication quality which should be satisfied by using the data transmission from the single base station in a case of determining whether the only selected communication terminal needs the data transmission through the cooperation among the plurality of other base stations;
transmit a transmission instruction of cooperation information to the only selected communication terminal in a case where a determination is made that the only selected communication terminal cannot secure the communication quality;
receive the cooperation information transmitted from the only selected communication terminal;
transmit a result of the wireless resource allocation for the data transmission through the cooperation among the plurality of other base stations to cooperating base stations that cooperate with the base station;
allocate wireless resources for the data transmission from the single base station to the only selected communication terminal, based on the received information necessary for the data transmission from the single base station in a case where a determination is made that the only selected communication terminal can secure the communication quality; and
refer to a result of the wireless resource allocation to the selected communication terminal for the data transmission from the single base station, and determine that cooperative transmission is necessary when the wireless resource allocation for the data transmission from the single base station to the selected communication terminal is determined as a failure, the selected communication terminal not being allocated the wireless resources for the data transmission when the wireless resource allocation for the data transmission from the single base station to the selected communication terminal is determined as the failure; and
the cooperation information is information that is necessary for the data transmission through the cooperation among the plurality of other base stations.

12. The base station according to claim 11,
wherein the cooperation information includes information necessary to execute data transmission to the only selected communication terminal through the cooperation among the plurality of other base stations, and information necessary to execute data transmission to a plurality of the only selected communication terminals through the cooperation among the plurality of other base stations,
wherein the base station is configured to determine whether the data transmission to the only selected communication terminal through the cooperation among the plurality of other base stations or the data transmission to the plurality of the only selected communication terminals through the cooperation among the plurality of other base stations is to be executed based on the received cooperation information.

* * * * *